US012621780B2

(12) United States Patent
Liu et al.

(10) Patent No.: US 12,621,780 B2
(45) Date of Patent: May 5, 2026

(54) MULTIPLEXING SIDELINK-SYNCHRONIZATION SIGNAL BLOCK (S-SSB) AND PHYSICAL SIDELINK CONTROL CHANNEL/PHYSICAL SIDELINK SHARED CHANNEL (PSCCH/PSCCH) AND FULFILMENT OF OCCUPANCY CHANNEL BANDWIDTH (OCB) FOR NEW RADIO-UNLICENSED (NR-U) SIDELINK

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Changlong Xu, Beijing (CN); Ozcan Ozturk, San Diego, CA (US); Peter Gaal, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 17/923,760

(22) PCT Filed: May 29, 2020

(86) PCT No.: PCT/CN2020/093181
§ 371 (c)(1),
(2) Date: Nov. 7, 2022

(87) PCT Pub. No.: WO2021/237654
PCT Pub. Date: Dec. 2, 2021

(65) Prior Publication Data
US 2023/0319745 A1    Oct. 5, 2023

(51) Int. Cl.
H04L 5/00      (2006.01)
H04L 1/00      (2006.01)
(Continued)

(52) U.S. Cl.
CPC ....... *H04W 56/0015* (2013.01); *H04L 1/0038* (2013.01); *H04W 72/02* (2013.01); *H04W 72/1263* (2013.01); *H04W 72/25* (2023.01)

(58) Field of Classification Search
None
See application file for complete search history.

(56) References Cited

U.S. PATENT DOCUMENTS

| | | | | |
|---|---|---|---|---|
| 12,028,884 | B2 * | 7/2024 | Panteleev | ......... H04W 72/0453 |
| 2020/0015214 | A1 | 1/2020 | Si et al. | |
| 2021/0321384 | A1 | 10/2021 | Osawa et al. | |

FOREIGN PATENT DOCUMENTS

| | | |
|---|---|---|
| CN | 108353386 A | 7/2018 |
| CN | 110996395 A | 4/2020 |

(Continued)

OTHER PUBLICATIONS

Huawei, et al., "Remaining Details of Sidelink Synchronization Mechanisms," 3GPP TSG RAN WG1 Meeting #100-e, R1-2000185, Feb. 24-Mar. 6, 2020 (Mar. 6, 2020), 14 pages, the Whole Document, Sections 1-2.

(Continued)

*Primary Examiner* — Minh Trang T Nguyen
(74) *Attorney, Agent, or Firm* — Harrity & Harrity LLP/Qualcomm Incorporated

(57) ABSTRACT

Wireless communications systems and methods related to multiplexing a sidelink-synchronization signal block (S-SSB) transmission with a physical sidelink control channel (PSCCH)/physical sidelink shared channel (PSSCH) transmission for occupancy channel bandwidth (OCB) ful- (Continued)

1500

Determine a multiplex configuration for multiplexing a sidelink transmission with a sidelink-synchronization signal block (S-SSB) transmission in a sidelink bandwidth part (BWP) — 1510

Communicate, in the sidelink BWP during a sidelink slot, the S-SSB transmission — 1520

Communicate, in the sidelink BWP during the sidelink slot, the sidelink transmission, wherein the communicating the S-SSB transmission and the communicating the sidelink transmission includes multiplexing the sidelink transmission and the S-SSB transmission based on the multiplex configuration. — 1530 filment are provided. A user equipment (UE) determines a multiplex configuration for multiplexing a sidelink transmission with a S-SSB transmission in a sidelink bandwidth part (BWP). The UE communicates, in the sidelink BWP during a sidelink slot, the S-SSB transmission. The UE communicates, in the sidelink BWP during the sidelink slot, the sidelink transmission, where the S-SSB transmission and the sidelink transmission are communicated by multiplexing the sidelink transmission and the S-SSB transmission based on the multiplex configuration.

35 Claims, 16 Drawing Sheets

(51) Int. Cl.
| | | |
|---|---|---|
| *H04W 56/00* | (2009.01) | |
| *H04W 72/02* | (2009.01) | |
| *H04W 72/1263* | (2023.01) | |
| *H04W 72/25* | (2023.01) | |

(56) References Cited

FOREIGN PATENT DOCUMENTS

| WO | 2017117811 A1 | 7/2017 |
|---|---|---|
| WO | 2019217007 A1 | 11/2019 |
| WO | 2020031384 A1 | 2/2020 |
| WO | 2020033086 A1 | 2/2020 |

OTHER PUBLICATIONS

Huawei, et al., "Sidelink Synchronization Mechanisms for NR V2X", 3GPP TSG RAN WG1 Meeting #98bis, R1-1910057, Chongqing, China, Oct. 14-20, 2019, Oct. 20, 2019 (Oct. 20, 2019) Sections 1-2, 27 Pages.

Huawei, et al., "Sidelink Synchronization Mechanisms for NR V2X", 3GPP TSG RAN WG1 Meeting #99, R1-1911885, Reno, USA, Nov. 18-22, 2019, Nov. 22, 20 19 (Nov. 22, 20 19) Sections 1-2, 24 Pages.

International Search Report and Written Opinion—PCT/CN2020/093181—ISA/EPO—Feb. 25, 2021.

Spreadtrum Communications: "Discussion on Synchronization Mechanism for NR V2X", 3GPP TSG RAN WG1 Meeting #98bis, R1-1910008, Chongqing, China, Oct. 14-20, 2019, Oct. 20, 2019 (Oct. 20, 2019) the Whole Document, pp. 1-10.

Huawei, et al., "Sidelink synchronization mechanisms for NR V2X", R1-1900025, 3rd Generation Partnership Project, Mobile Competence Centre, 650, Route Des Lucioles, F-06921, Sophia-Antipolis Cedex, France, vol. RAN WG1, No. Taipei, Jan. 21, 2019-Jan. 25, 2019, Jan. 20, 2019, XP051592951, 12 Pages, section 2.5.

Supplementary European Search Report—EP20938095—Search Authority—The Hague—Jan. 30, 2024.

Huawei, et al., "Sidelink Synchronization Mechanisms for NR V2X", 3GPP TSG RAN WG1 Meeting #98bis, R1-1910057, Chongqing, China, Oct. 14-20, 2019, 27 Pages, Chapters 2.1 and 3.

Taiwan Search Report—TW110118890—TIPO—Jan. 12, 2025.

CATT: "Feature Lead Summary on AI 7.2.4.3 #2 Sidelink Synchronization Mechanism", 3GPP TSG RAN WG1 Meeting #100, R1-2000833, e-Meeting, Feb. 24, 2020-Mar. 6, 2020, pp. 1-26, Feb. 24, 2020.

Spreadtrum Communications: "Discussion on NR Sidelink Physical Layer Structure", 3GPP TSG RAN WG1 Ad-Hoc Meeting 1901, R1-1900713, vol. RAN WG1, No. Taipei, Jan. 21, 2019-Jan. 25, 2019, Jan. 20, 2019, 10 Pages, Jan. 12, 2019, XP051593560.

* cited by examiner

1500

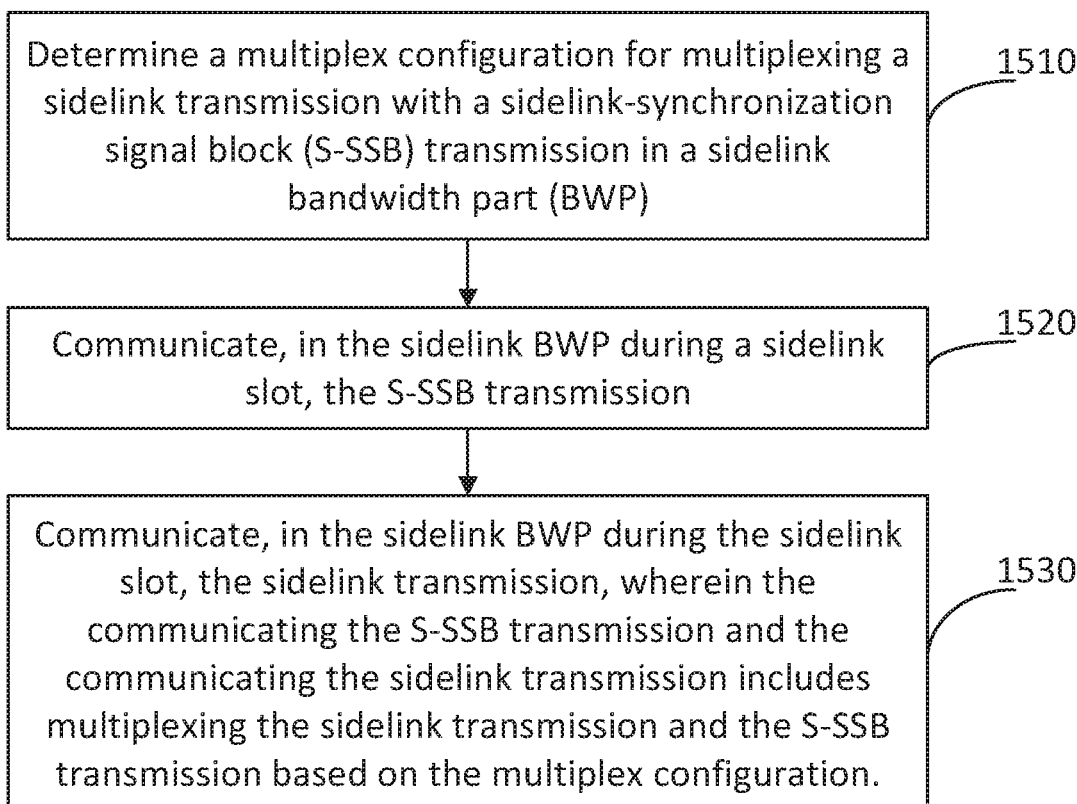

Determine a multiplex configuration for multiplexing a sidelink transmission with a sidelink-synchronization signal block (S-SSB) transmission in a sidelink bandwidth part (BWP) — 1510

Communicate, in the sidelink BWP during a sidelink slot, the S-SSB transmission — 1520

Communicate, in the sidelink BWP during the sidelink slot, the sidelink transmission, wherein the communicating the S-SSB transmission and the communicating the sidelink transmission includes multiplexing the sidelink transmission and the S-SSB transmission based on the multiplex configuration. — 1530

Determine a multiplex configuration for multiplexing a sidelink transmission with a sidelink-synchronization signal block (S-SSB) transmission in a sidelink bandwidth part (BWP)          1610

Transmit, to a user equipment (UE), the multiplex configuration.          1620

MULTIPLEXING SIDELINK-SYNCHRONIZATION SIGNAL BLOCK (S-SSB) AND PHYSICAL SIDELINK CONTROL CHANNEL/PHYSICAL SIDELINK SHARED CHANNEL (PSCCH/PSSCH) AND FULFILMENT OF OCCUPANCY CHANNEL BANDWIDTH (OCB) FOR NEW RADIO-UNLICENSED (NR-U) SIDELINK

CROSS-REFERENCE TO RELATED APPLICATIONS

The present application is a 35 U.S.C. 371 National Phase entry of Patent Cooperation Treaty (PCT) Application No. PCT/CN2020/093181, filed May 29, 2020, which is hereby expressly incorporated herein by reference in its entirety.

TECHNICAL FIELD

This application relates to wireless communication systems, and more particularly to multiplexing a sidelink-synchronization signal block (S-SSB) transmission with a physical sidelink control channel (PSCCH)/physical sidelink shared channel (PSSCH) transmission in a shared radio frequency band (e.g., in a shared spectrum or an unlicensed spectrum) shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BS s), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X)

communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE), the method includes determining a multiplex configuration for multiplexing a sidelink transmission with a sidelink-synchronization signal block (S-SSB) transmission in a sidelink bandwidth part (BWP); communicating, in the sidelink BWP during a sidelink slot, the S-SSB transmission; and communicating, in the sidelink BWP during the sidelink slot, the sidelink transmission, where the communicating the S-SSB transmission and the communicating the sidelink transmission includes multiplexing the sidelink transmission and the S-SSB transmission based on the multiplex configuration.

In an additional aspect of the disclosure, a method of wireless communication performed by a base station (BS), the method includes determining a multiplex configuration for multiplexing a sidelink transmission with a sidelink-synchronization signal block (S-SSB) transmission in a sidelink bandwidth part (BWP); and transmitting, to a user equipment (UE), the multiplex configuration.

In an additional aspect of the disclosure, a user equipment (UE) includes a processor configured to determine a multiplex configuration for multiplexing a sidelink transmission with a sidelink-synchronization signal block (S-SSB) transmission in a sidelink bandwidth part (BWP); and a transceiver configured to communicate, in the sidelink BWP during a sidelink slot, the S-SSB transmission; and communicate, in the sidelink BWP during the sidelink slot, sidelink transmission, where the transceiver configured to communicate the S-SSB transmission and the sidelink transmission is configured to multiplex the sidelink transmission and the S-SSB transmission based on the multiplex configuration.

In an additional aspect of the disclosure, a base station (BS) includes a processor configured to determine a multiplex configuration for multiplexing a sidelink transmission with a sidelink-synchronization signal block (S-SSB) transmission in a sidelink bandwidth part (BWP); and a transceiver configured to transmit, to a user equipment (UE), the multiplex configuration.

In an additional aspect of the disclosure, a non-transitory computer-readable medium having program code recorded thereon, the program code includes code for causing a user equipment (UE) to determine a multiplex configuration for multiplexing a sidelink transmission with a sidelink-synchronization signal block (S-SSB) transmission in a sidelink bandwidth part (BWP); code for causing the UE to communicate, in the sidelink BWP during a sidelink slot, the S-SSB transmission; and code for causing the UE to communicate, in the sidelink BWP during the sidelink slot, the sidelink transmission, where the code for causing the UE to communicate the S-SSB transmission and the code for causing the UE to communicate the sidelink transmission are configured to multiplex the sidelink transmission and the S-SSB transmission based on the multiplex configuration.

In an additional aspect of the disclosure, a non-transitory computer-readable medium having program code recorded thereon, the program code includes code for causing a base station (BS) to determine a multiplex configuration for multiplexing a sidelink transmission with a sidelink-syn-chronization signal block (S-SSB) transmission in a sidelink bandwidth part (BWP); and code for causing the BS to transmit, to a user equipment (UE), the multiplex configu-ration.

In an additional aspect of the disclosure, a user equipment (UE) includes means for determining a multiplex configu-ration for multiplexing a sidelink transmission with a side-link-synchronization signal block (S-SSB) transmission in a sidelink bandwidth part (BWP); means for communicating, in the sidelink BWP during a sidelink slot, the S-SSB transmission; and means for communicating, in the sidelink BWP during the sidelink slot, the sidelink transmission, where the means for communicating the S-SSB transmission and the means for communicating the sidelink transmission are configured to multiplex the sidelink transmission and the S-SSB transmission based on the multiplex configuration.

In an additional aspect of the disclosure, a base station (BS) includes means for determining a multiplex configu-ration for multiplexing a sidelink transmission with a side-link-synchronization signal block (S-SSB) transmission in a sidelink bandwidth part (BWP); and means for transmitting, to a user equipment (UE), the multiplex configuration.

Other aspects, features, and embodiments of the present invention will become apparent to those of ordinary skill in the art, upon reviewing the following description of specific, exemplary embodiments of the present invention in con-junction with the accompanying figures. While features of the present invention may be discussed relative to certain embodiments and figures below, all embodiments of the present invention can include one or more of the advanta-geous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in vari-ous devices, systems, and methods.

4

Figure 5:
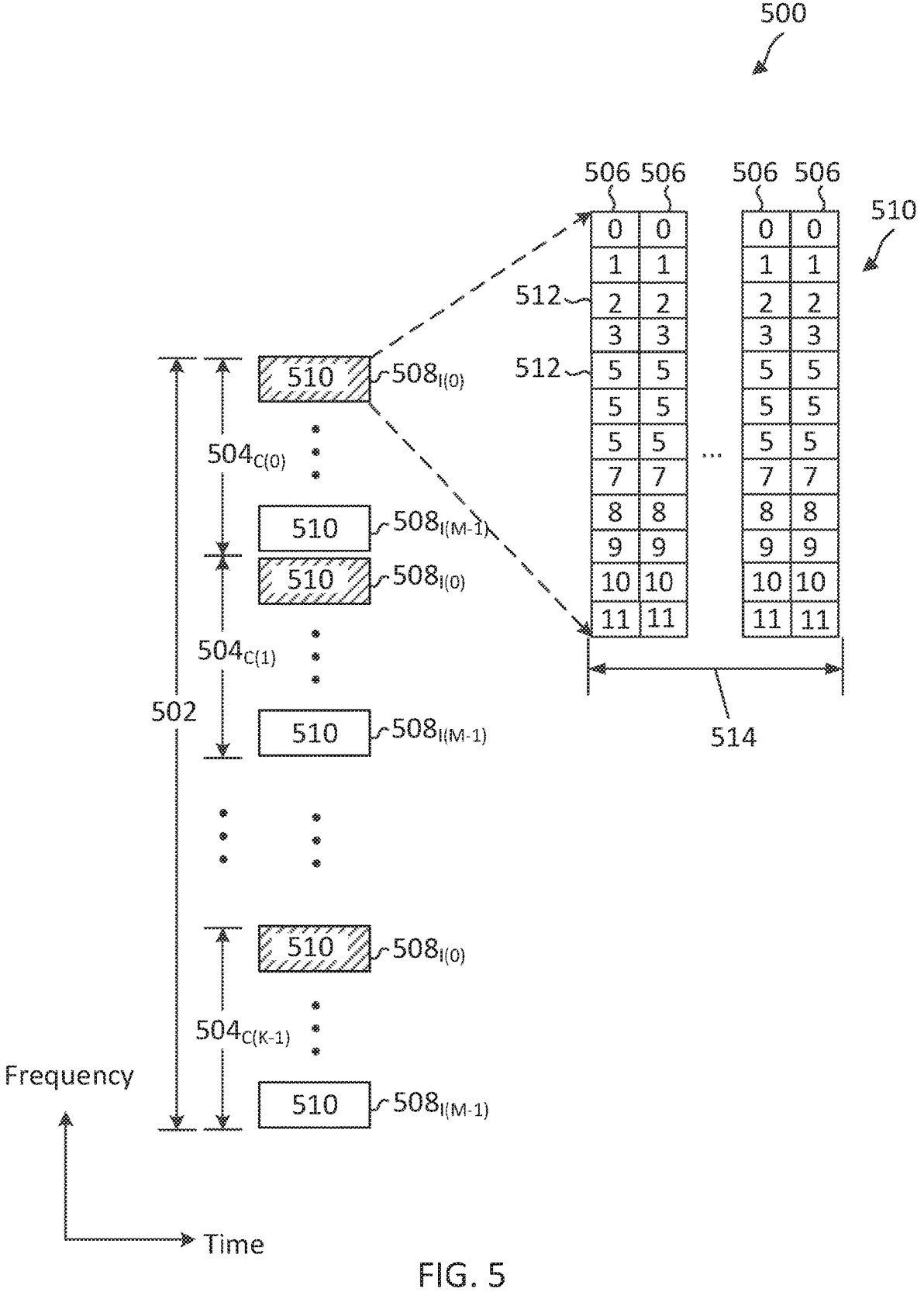

FIG. 5 illustrates a sidelink resource allocation scheme based on a frequency-interlaced waveform according to some aspects of the present disclosure.

Figure 6:
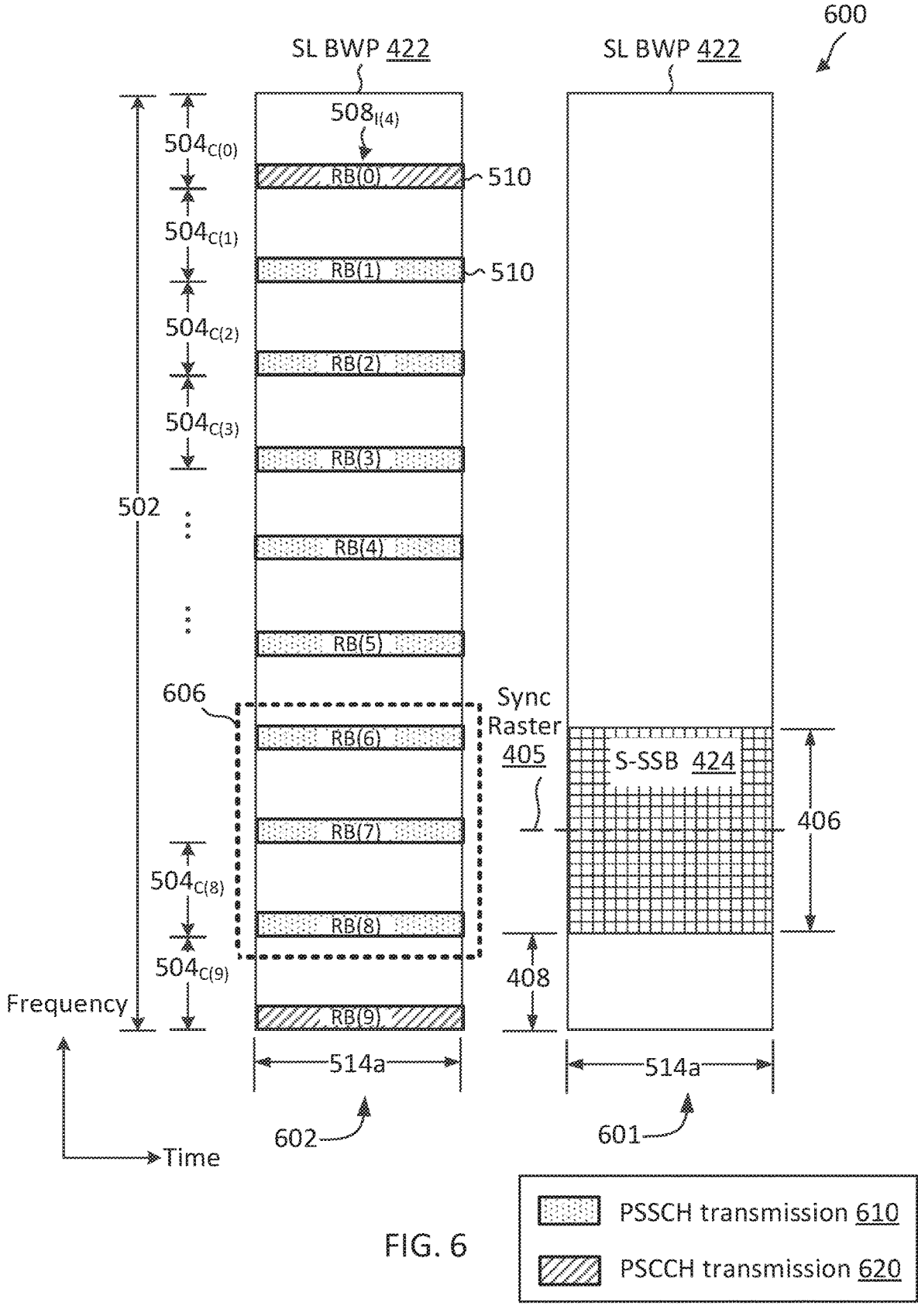

FIG. 6 illustrates an S-SSB and physical sidelink control channel (PSCCH)/physical sidelink shared channel (PSSCH) multiplexing scheme according to some aspects of the present disclosure.

Figure 7:
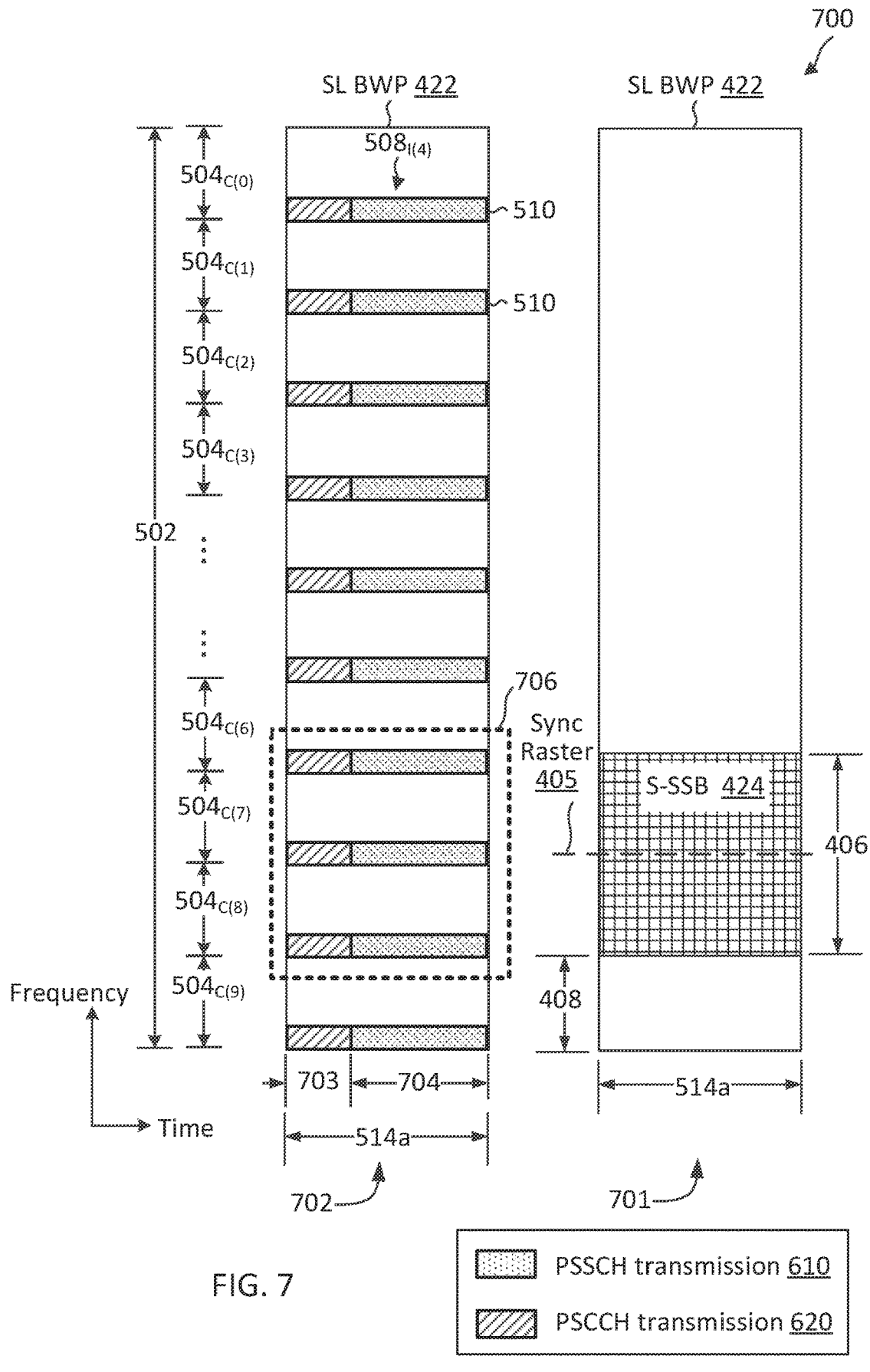

FIG. 7 illustrates an S-SSB and PSCCH/PSSCH multi-plexing scheme according to some aspects of the present disclosure.

Figure 8:
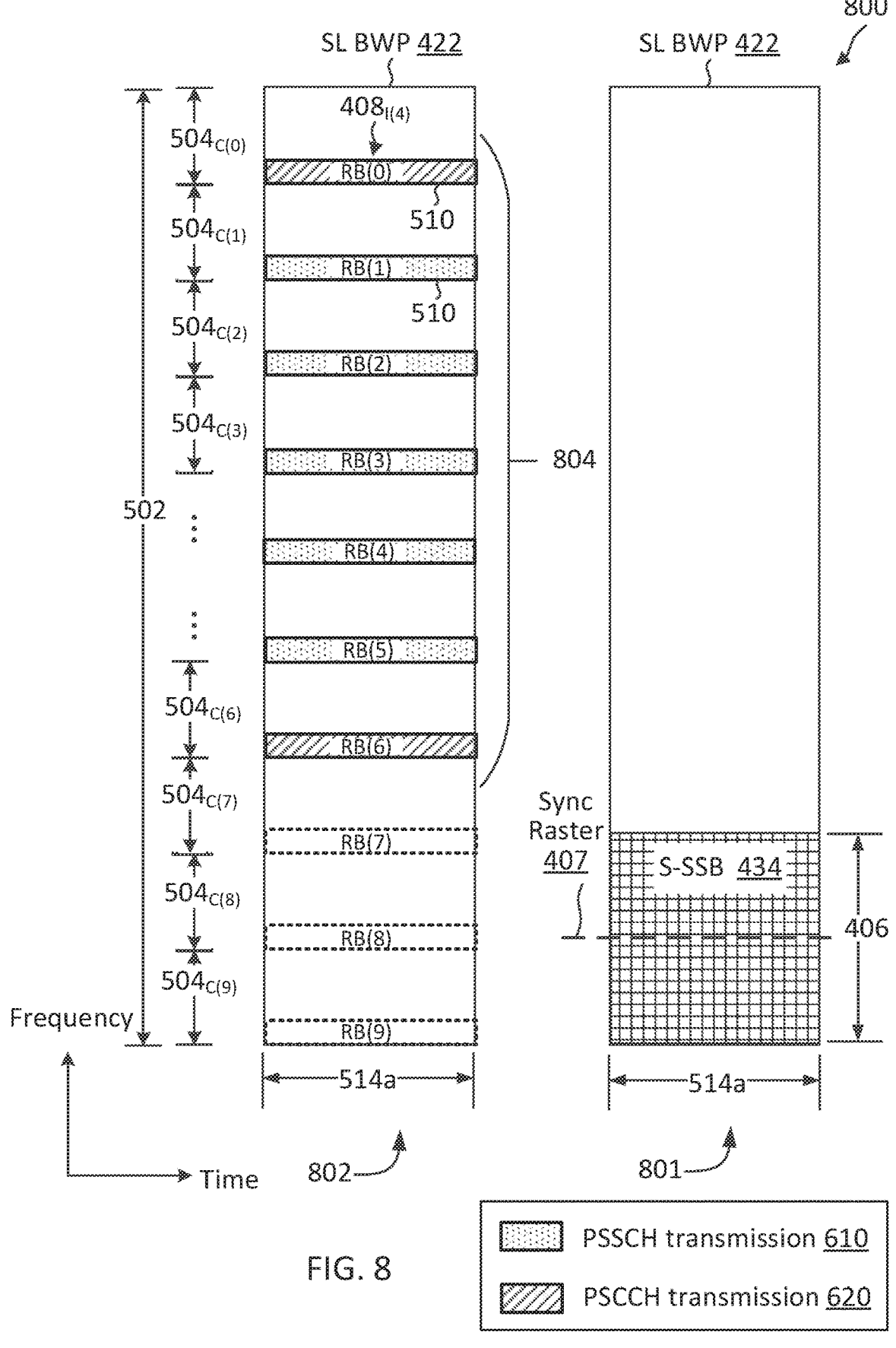

FIG. 8 illustrates an S-SSB and PSCCH/PSSCH multi-plexing scheme according to some aspects of the present disclosure.

Figure 9:
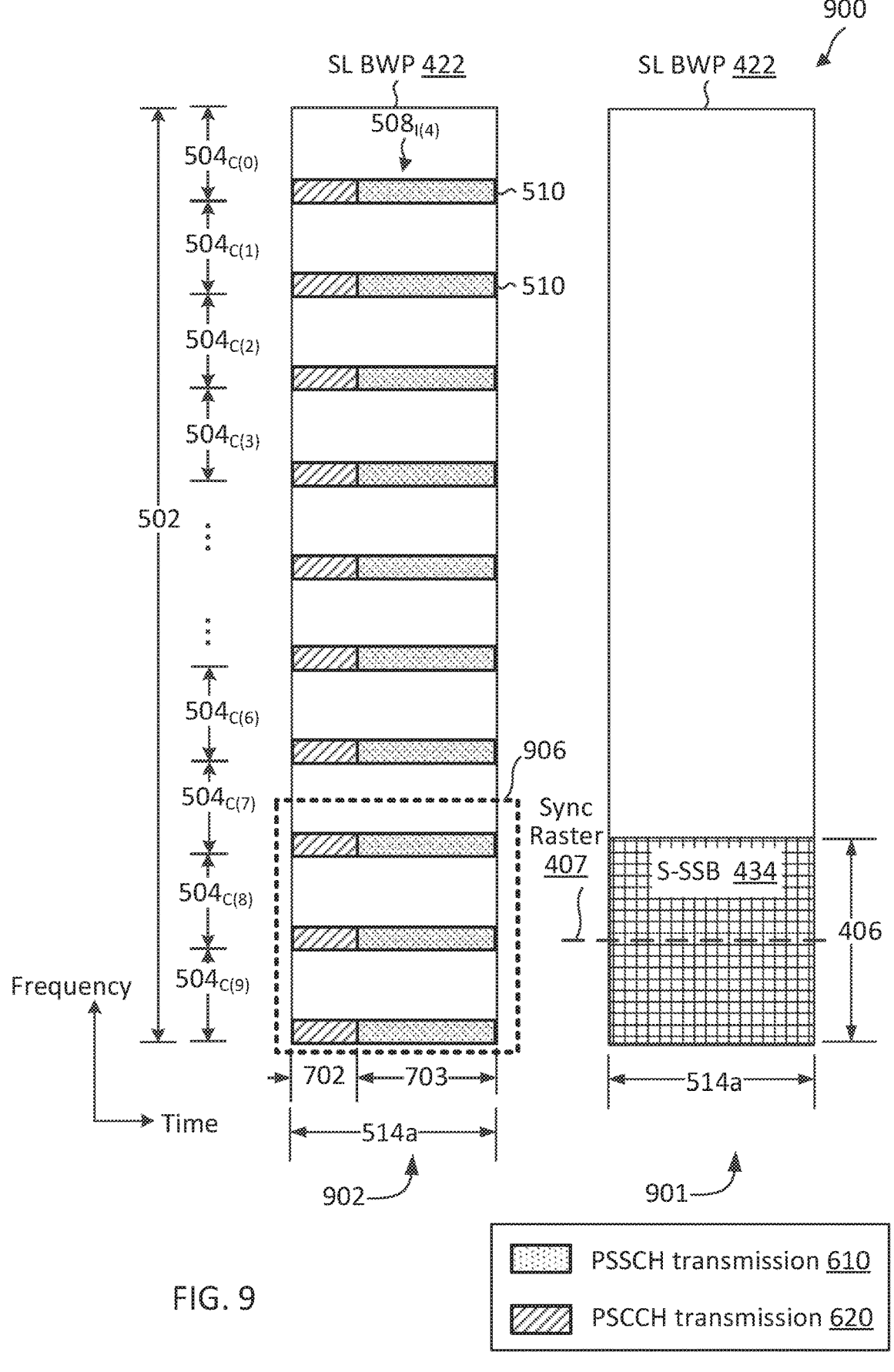

FIG. 9 illustrates an S-SSB and PSCCH/PSSCH multi-plexing scheme according to some aspects of the present disclosure.

Figure 10:
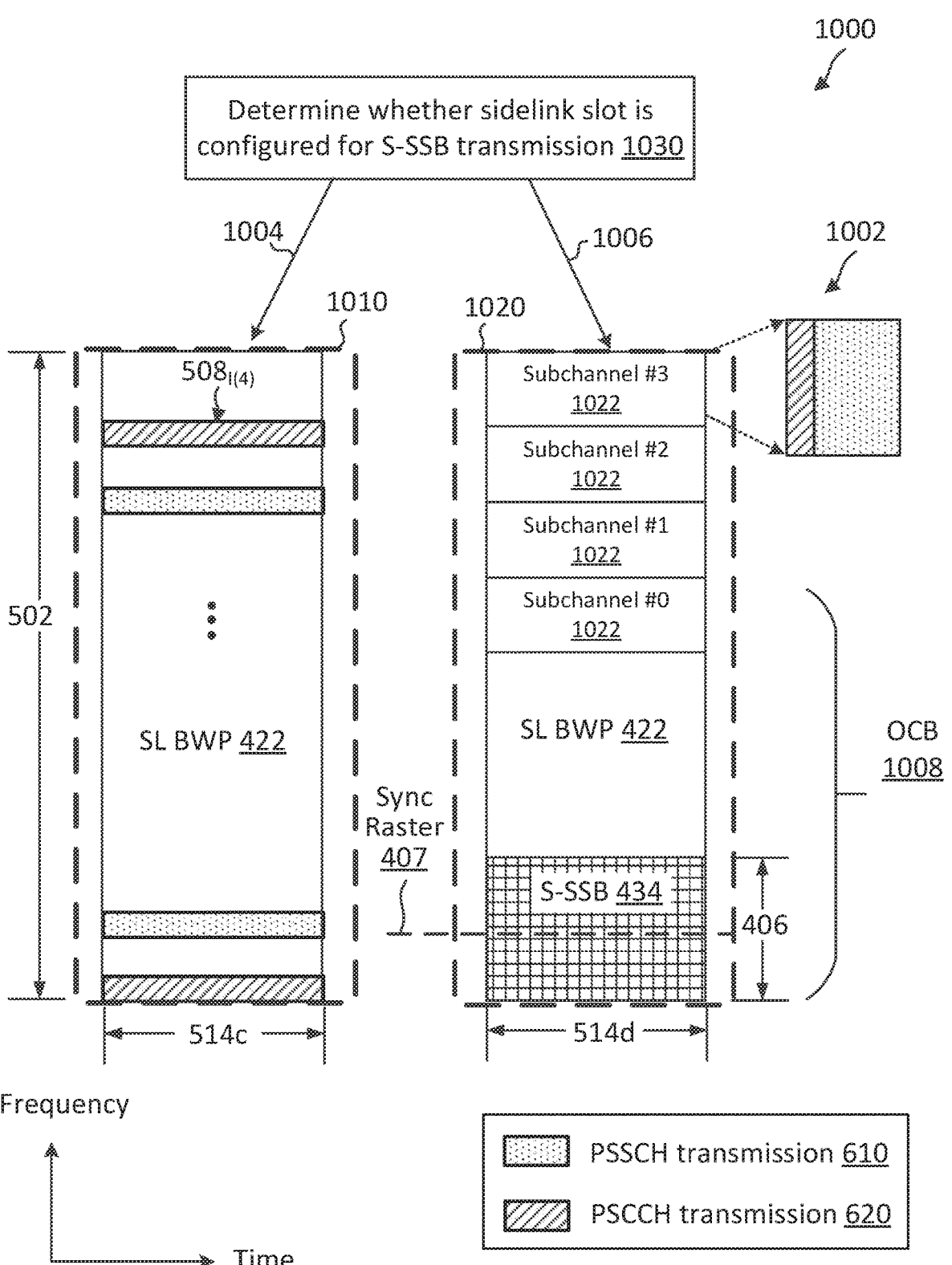

FIG. 10 illustrates an S-SSB and PSCCH/PSSCH multi-plexing scheme according to some aspects of the present disclosure.

Figure 11:
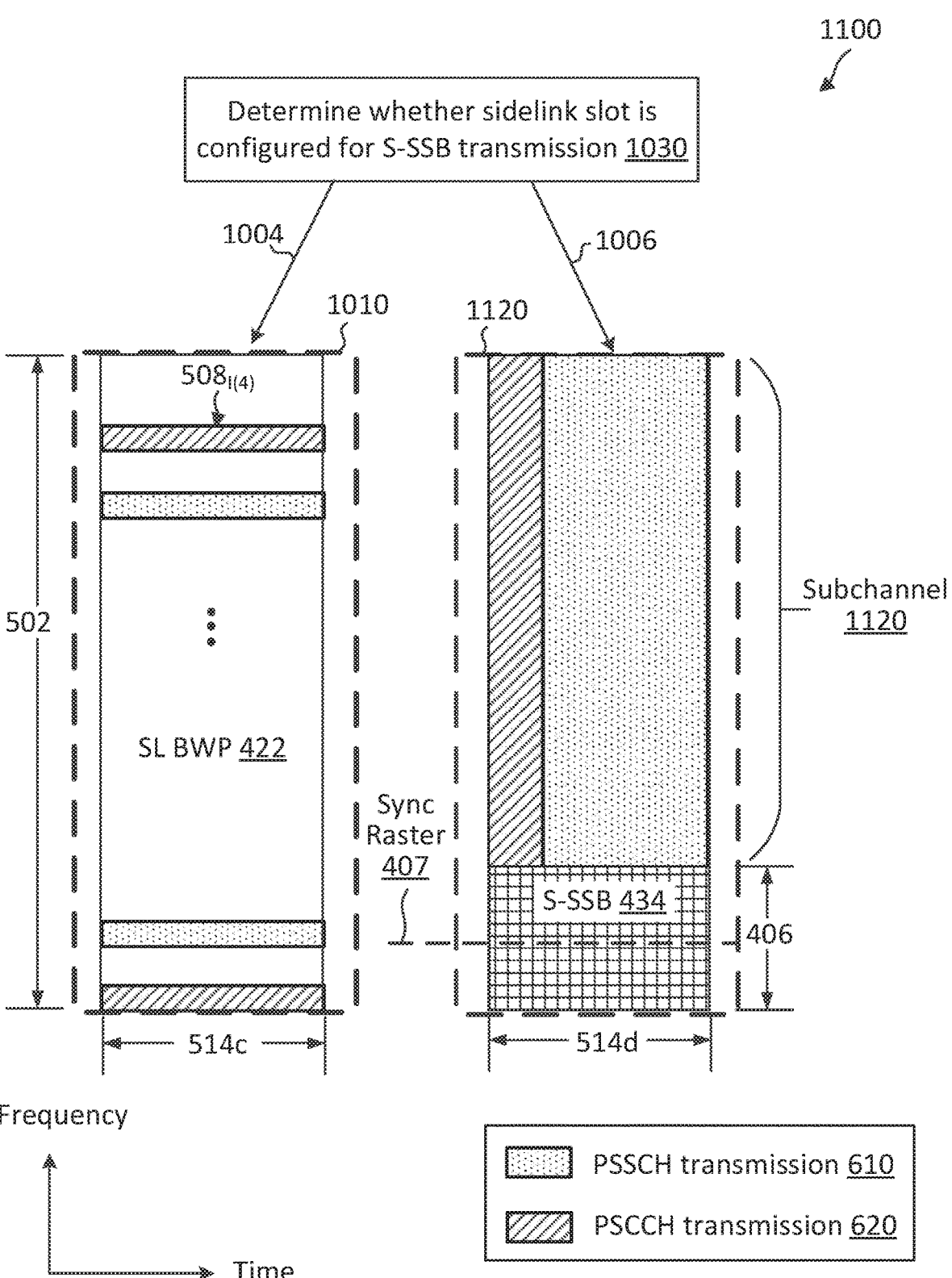

FIG. 11 illustrates an S-SSB and PSCCH/PSSCH multi-plexing scheme according to some aspects of the present disclosure.

Figure 12:
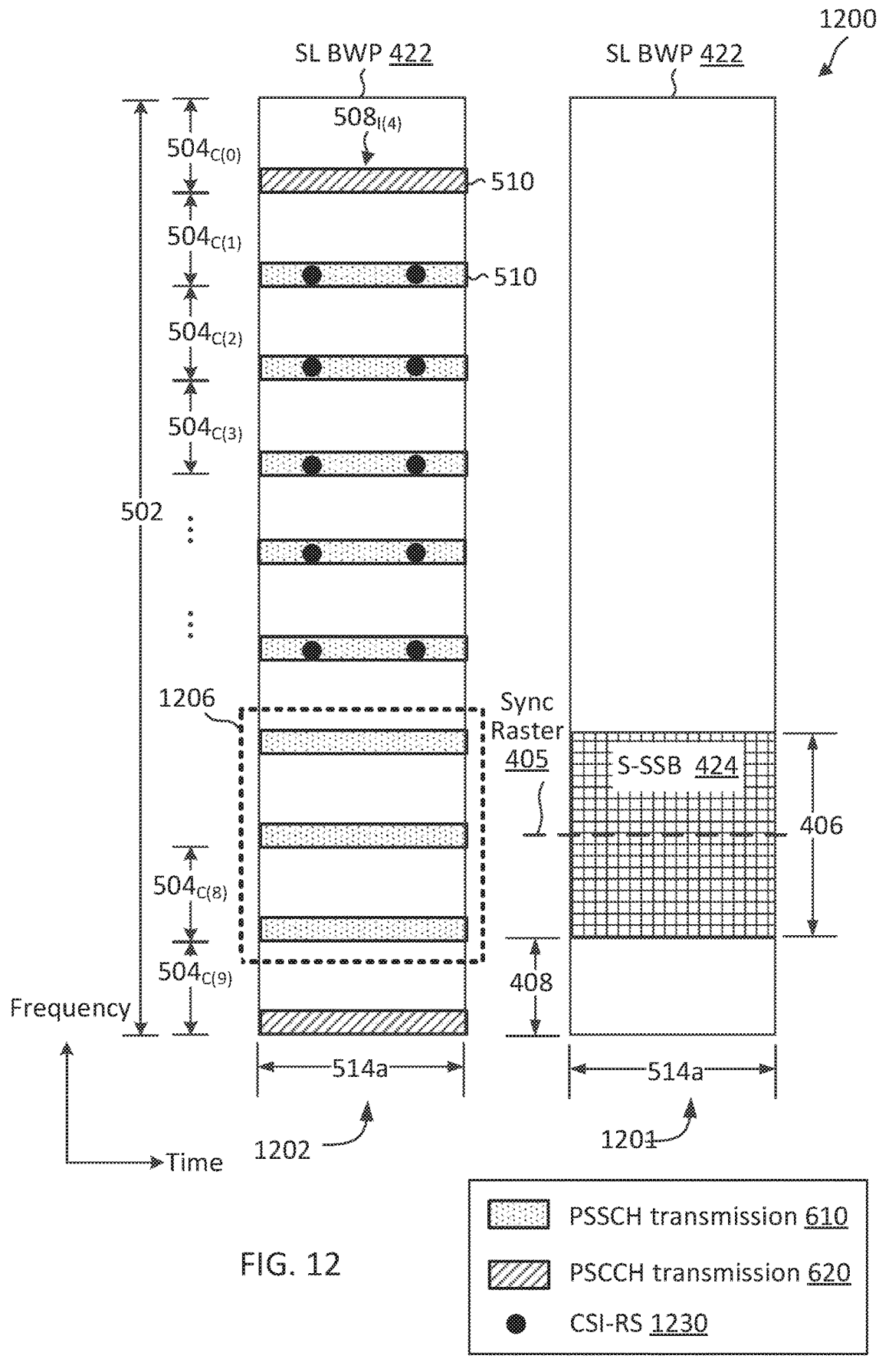

FIG. 12 illustrates an S-SSB and PSCCH/PSSCH multi-plexing scheme according to some aspects of the present disclosure.

Figure 13:
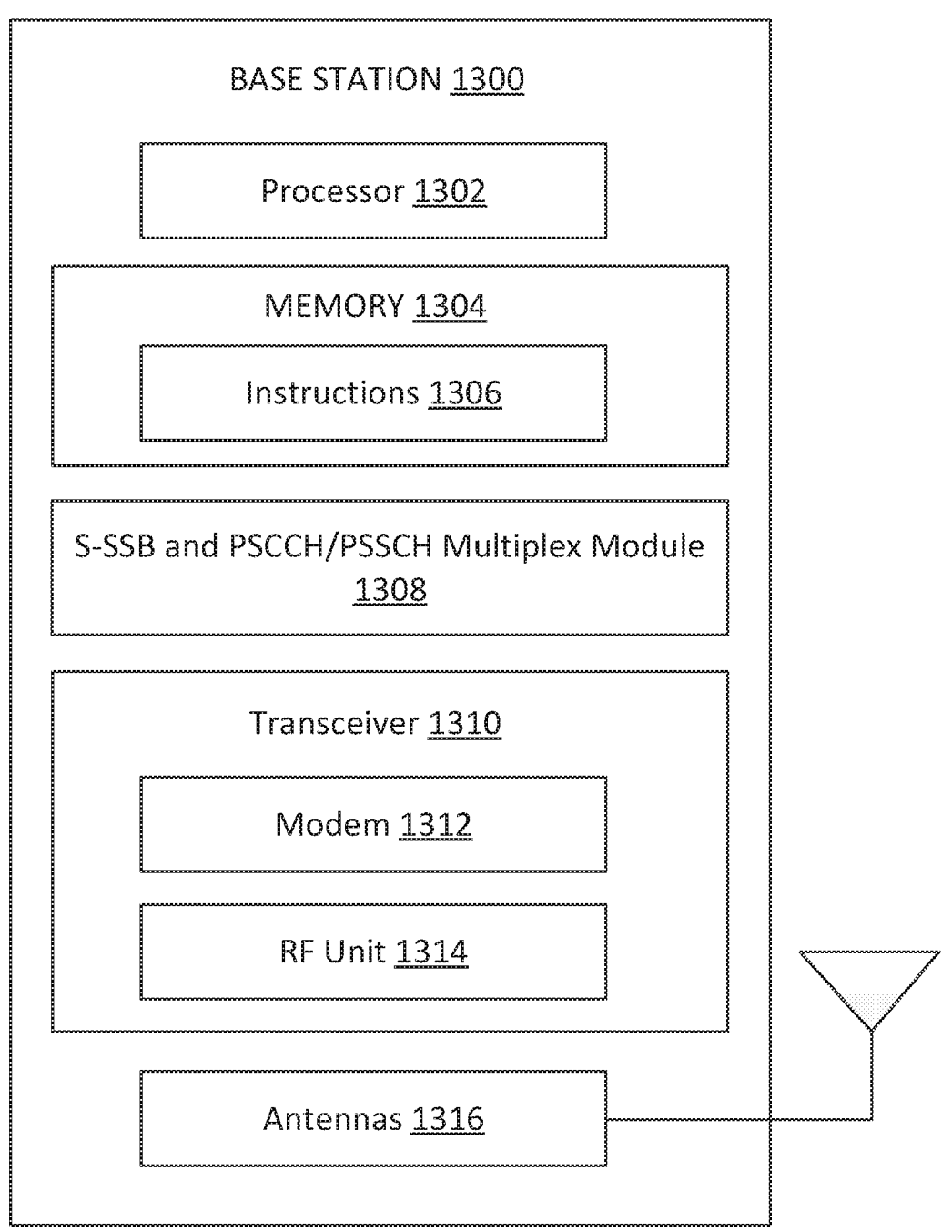

FIG. 13 is a block diagram of an exemplary base station (BS) according to some aspects of the present disclosure.

Figure 14:
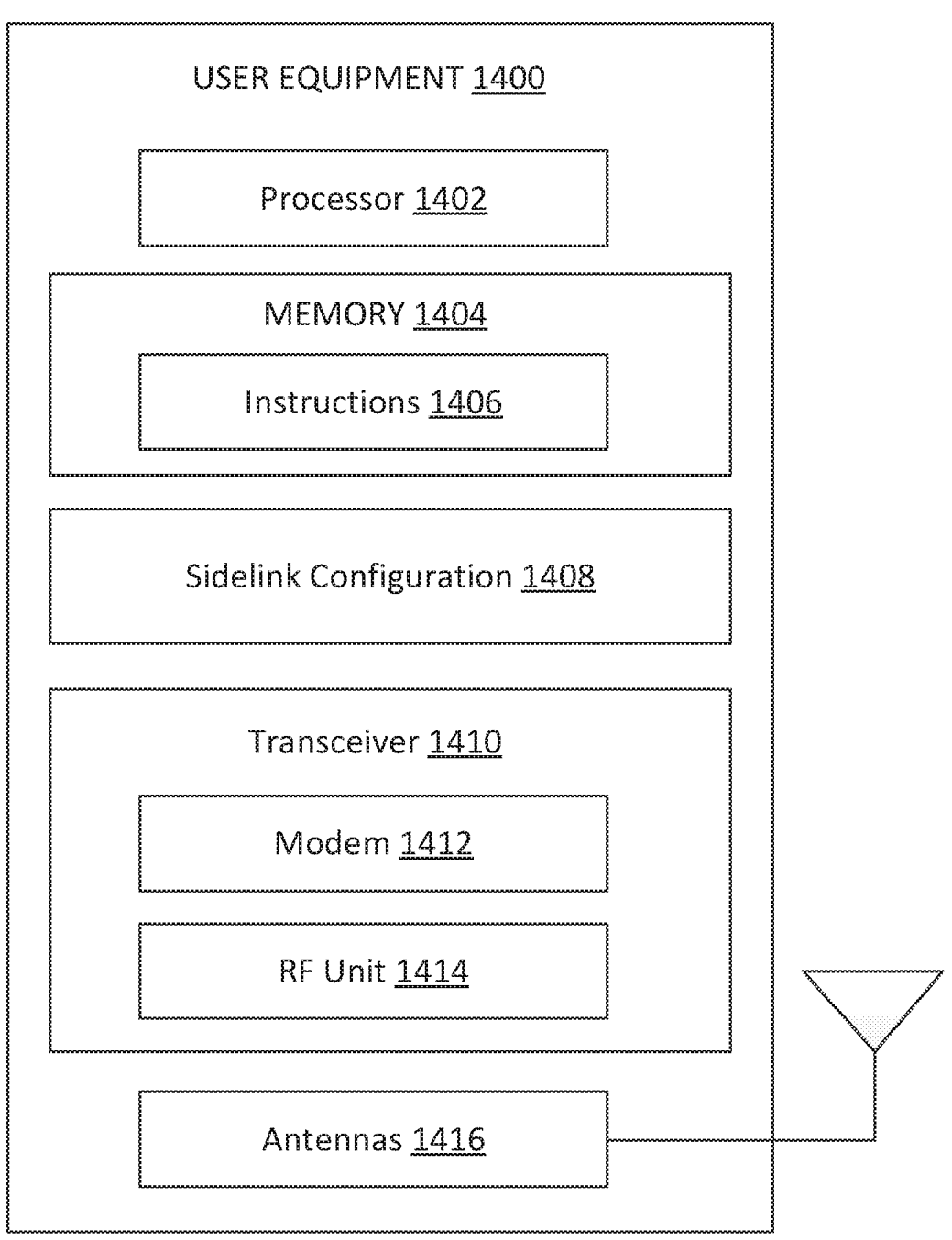

FIG. 14 is a block diagram of an exemplary user equip-ment (UE) according to some aspects of the present disclo-sure.

FIG. 15 is a flow diagram of a wireless communication method according to some aspects of the present disclosure.

Figure 16:
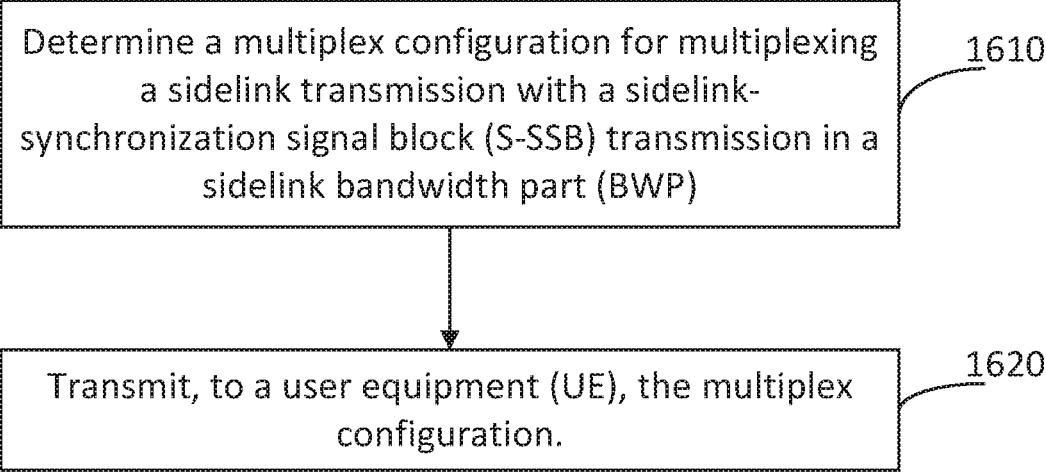

FIG. 16 is a flow diagram of a wireless communication method according to some aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understand-ing of the various concepts. However, it will be apparent to those skilled in the art that these concepts may be practiced without these specific details. In some instances, well-known structures and components are shown in block dia-gram form in order to avoid obscuring such concepts.

This disclosure relates generally to wireless communica-tions systems, also referred to as wireless communications networks. In various embodiments, the techniques and appa-ratus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. As used herein, the terms "sync UE" or "sidelink sync UE" refer to a sidelink UE transmitting an S-SSB to facilitate sidelink communications among multiple sidelink UEs (e.g., when operating in a standalone sidelink system), and the terms are interchangeable without departing from the scope of the present disclosure. A sidelink UE may operate as a transmitting sidelink UE at one time and as a receiving sidelink UE at another time. A sidelink sync UE may also operate as a transmitting sidelink UE at one time and operate as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A serving BS may also configure a sidelink UE to operate as a sidelink sync UE to provide sidelink system information for out-of-coverage sidelink UEs to communicate sidelink communications. For instance, a sidelink sync UE may provide sidelink system information by broadcasting sidelink-synchronization signal block (S-SSB). The S-SSB may be analogous to the SSB broadcast by a BS. For instance, an S-SSB may include synchronization signals and/or sidelink system information. Some examples of sidelink system information may include a sidelink bandwidth part (BWP) configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink can benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or occupancy channel bandwidth (OCB) for transmissions in the unlicensed bands. For example, the unlicensed national information infrastructure (UNIT) radio band has an OCB requirement of about 70 percent (%).

Some sidelink systems may operate over a 20 MHz bandwidth in an unlicensed band. A BS may configure a sidelink resource pool over the 20 MHz band for sidelink communications. A sidelink resource pool is typically partitioned into multiple frequency subchannels or frequency subbands (e.g., about 5 MHz each) and a sidelink UE may select a sidelink resource (e.g., a subchannel) from the sidelink resource pool for sidelink communication. To satisfy an OCB of about 70%, a sidelink resource pool may utilize a frequency-interlaced structure. For instance, a frequency-interlaced-based sidelink resource pools may include a plurality of frequency interlaces over the 20 MHz band, where each frequency interlace may include a plurality of resource blocks (RBs) distributed over the 20 MHz band. For example, the plurality of RBs of a frequency interlace may be spaced apart from each other by one or more other RBs in the 20 MHz unlicensed band. A sidelink UE may select a sidelink resource in the form of frequency interlaces from the sidelink resource pool for sidelink communication. In other words, sidelink transmissions may utilize a frequency-interlaced waveform to satisfy an OCB of the unlicensed band. However, S-SSBs are transmitted in a set of contiguous RBs, for example, in about eleven contiguous RBs. As such, S-SSB transmissions alone may not meet the OCB requirement of the unlicensed band. Accordingly, it may be desirable for a sidelink sync UE to multiplex an S-SSB transmission with a sidelink communication (e.g., a PSCCH and a PSCCH) in a slot configured for S-SSB transmission so that the sidelink sync UE's transmission in the slot may comply with an OCB requirement.

The present application describes mechanisms for a sidelink UE to multiplex an S-SSB transmission with a sidelink transmission in a frequency band to satisfy an OCB of the frequency band. For instance, the sidelink UE may determine a multiplex configuration for multiplexing a sidelink transmission with an S-SSB transmission in a sidelink BWP. The sidelink UE may transmit the S-SSB transmission in the sidelink BWP during a sidelink slot. The sidelink UE may transmit a sidelink transmission in the sidelink BWP during the sidelink slot by multiplexing the sidelink transmission and the S-SSB transmission based on the multiplex configuration.

In some aspects, the sidelink UE may transmit the S-SSB transmission at an offset from a lowest frequency of the sidelink BWP based on a synchronization raster (e.g., an NR-U sync raster). In some aspects, the sidelink UE may transmit the S-SSB transmission aligned to a lowest frequency of the sidelink BWP. For instance, a sync raster can be defined for sidelink such that the S-SSB transmission may be aligned to a lowest frequency of the sidelink BWP.

In some aspects, the multiplex configuration includes a configuration for multiplexing the S-SSB transmission with a frequency interlaced waveform sidelink transmission to meet the OCB requirement. For instance, the sidelink transmission may include a PSCCH transmission and a PSSCH transmission multiplexed in frequency or time within a frequency interlace with RBs spaced apart in the sidelink BWP. The PSSCH transmission may include at least one of sidelink data or a channel state information-reference signal (CSI-RS). To avoid collision with the S-SSB transmission, the sidelink UE may puncture the PSCCH transmission and/or the PSSCH transmission at RBs that are at least partially overlapping with the S-SSB transmission. In some other instances, the sidelink UE may rate-match the PSCCH transmission and/or the PSSCH transmission around RBs that are at least partially overlapping with the S-SSB transmission.

In some aspects, the multiplex configuration includes a configuration for multiplexing the S-SSB transmission with a subchannel-based sidelink transmission to meet the OCB requirement. For instance, the sidelink transmission may include a PSCCH transmission and a PSSCH transmission multiplexed in time within a subchannel including contiguous RBs in the sidelink BWP. For instance, the S-SSB transmission may be transmitted at a low frequency portion of the sidelink BWP, and the sidelink transmission may be transmitted in a subchannel located at a high frequency portion of the sidelink BWP to meet the OCB.

In some aspects, a BS may configure different sidelink resource pools for slots that are associated with S-SSB transmissions and for slots that are not associated with S-SSB transmissions. For instance, the BS may configure a first resource pool with a frequency-interlaced structure for slots that are not configured for S-SSB transmissions. The first resource pool may include a plurality of frequency interlaces (e.g., distributed RBs), where each frequency interlace may carry a PSCCH/PSSCH transmission. The BS may configure a second resource pool with a subchannel-based structure for slots that are configured for S-SSB transmission. The second resource pool may include a plurality of frequency subchannels (e.g., contiguous RBs), where each subchannel may carry a PSCCH/PSSCH transmission. To satisfy an OCB in a sidelink slot configured for an S-SSB transmission, the sidelink UE (e.g., a sidelink sync UE) may transmit an S-SSB transmission multiplexed with a PSCCH/PSSCH transmission. For instance, the S-SSB transmission may be transmitted in frequency resources located at a lower frequency portion of a SL BWP and the PSCCH/PSSCH transmission may be transmitted in frequency resources located at higher frequency portion of the sidelink BWP.

Aspects of the present disclosure can provide several benefits. For example, multiplexing an S-SSB transmission with a PSCCH/PSSCH transmission by a sidelink UE (e.g., a sidelink sync UE) allows the sidelink UE's transmission to meet an OCB requirement. Utilizing a frequency-interlaced waveform PSCCH/PSSCH transmission for multiplexing with the S-SSB transmission may guarantee meeting the OCB requirement. Utilizing a subchannel-based PSCCH/PSSCH transmission for multiplexing with the S-SSB transmission may provide a better compatibility with the S-SSB transmission since the subchannel may be selected at a higher frequency location to satisfy the OCB and without overlapping with the S-SSB transmission. As such, puncturing or rate-matching PSCCH and/or PSSCH transmission may be avoided with subchannel-based PSCCH/PSCCH transmissions. Utilizing a frequency interlaced structured sidelink resource pool for sidelink slots not configured for S-SSB transmission and a subchannel-based sidelink resource pool for sidelink slots configured for S-SSB transmissions can provide flexibility for sidelink communications, for example, maintaining a frequency interlaced waveforms for PSCCH/PSSCH transmission most of the time and switching to the subchannel-based PSCCH/PSSCH transmission occasionally for multiplexing with an S-SSB transmission.

Figure 1:
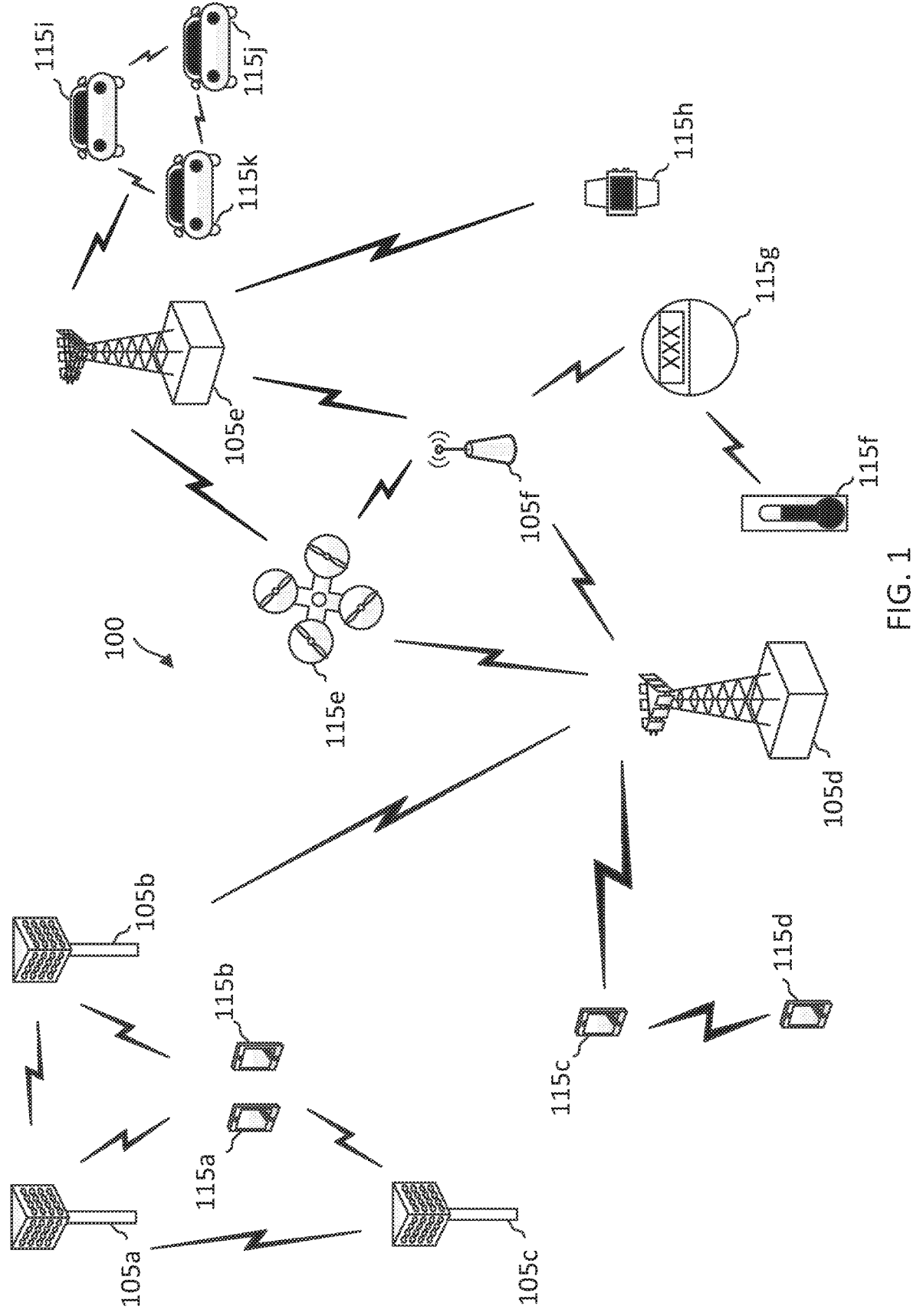
FIG. 1 illustrates a wireless communication network according to some aspects of the present disclosure.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105_d_ may perform backhaul communications with the BSs 105_a_-105_c_, as well as small cell, the BS 105_f._ The macro BS 105_d_ may also transmits multicast services which are subscribed to and received by the UEs 115_c_ and 115_d._ Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115_e_, which may be a drone. Redundant communication links with the UE 115_e_ may include links from the macro BSs 105_d_ and 105_e_, as well as links from the small cell BS 105_f._ Other machine type devices, such as the UE 115_f_ (e.g., a thermometer), the UE 115_g_ (e.g., smart meter), and UE 115_h_ (e.g., wearable device) may communicate through the network 100 either directly with BSs, such as the small cell BS 105_f_, and the macro BS 105_e_, or in multi-step-size configurations by communicating with another user device which relays its information to the network, such as the UE 115_f_ communicating temperature measurement information to the smart meter, the UE 115_g_, which is then reported to the network through the small cell BS 105_f._ The network 100 may also provide additional network efficiency through dynamic, low-latency TDD/FDD communications, such as V2V, V2X, C-V2X communications between a UE 115_i_, 115_j_, or 115_k_ and other UEs 115, and/or vehicle-to-infrastructure (V2I) communications between a UE 115_i_, 115_j_, or 115_k_ and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Figure 2:
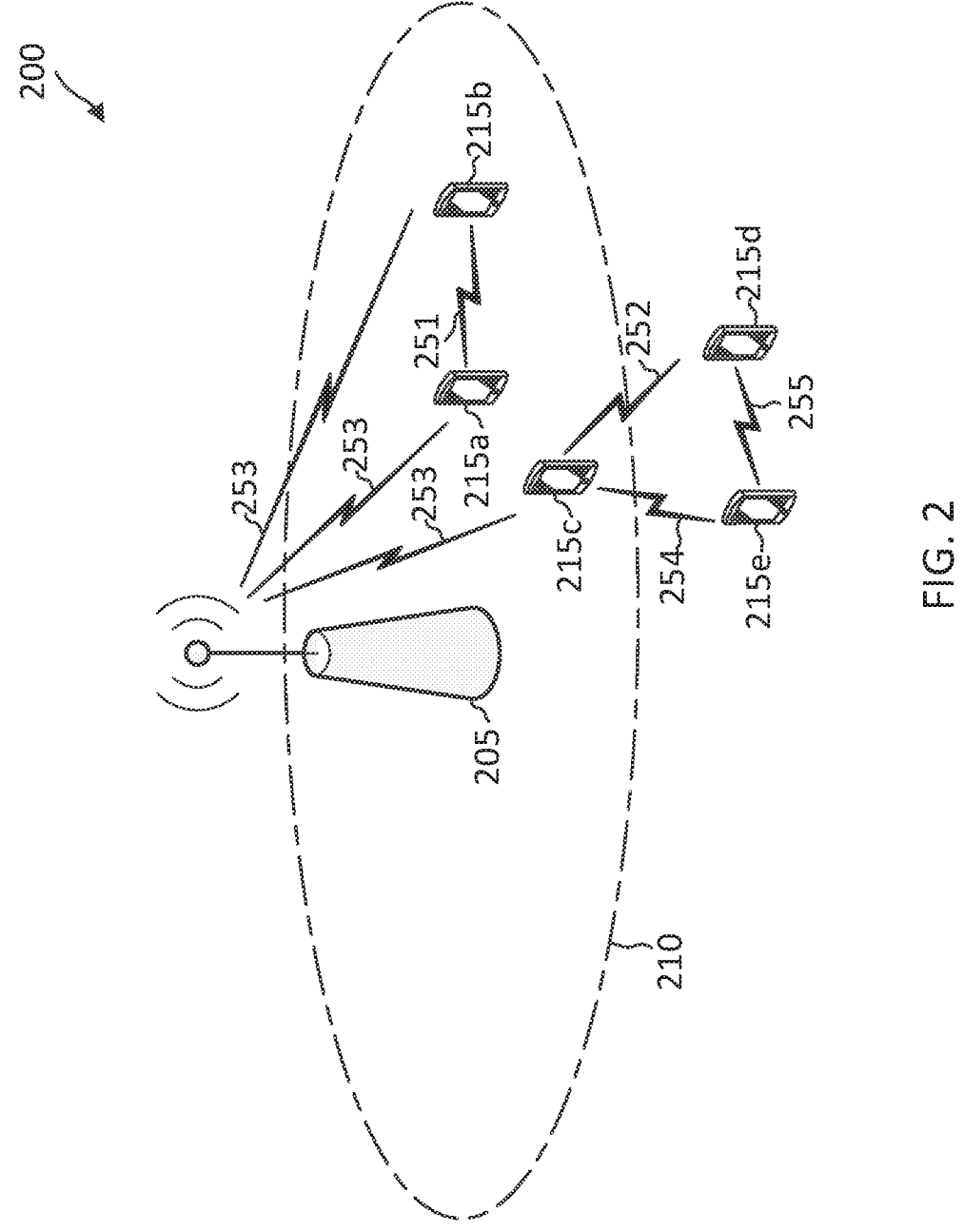
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a -bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement(ACK)-negative acknowledgement (NACK) for a previously transmitted PSSCH.

In some aspects, a BS 105 may configure a UE 115 to operate as a sidelink sync UE 115 to provide sidelink system information for other sidelink UEs 115, which may be out of the coverage of the BS 105, to communicate sidelink communications. The sidelink sync UE 115 may transmit the sidelink system information in the form of S-SSBs. An S-SSB may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some aspects, the BS 105 may configured the sidelink sync UE 115 transmit the S-SSB according to a synchronization raster defined for NR-U. In some instances, the S-SSB according to the NR-U synchronization raster may be offset from a lowest frequency of a corresponding sidelink BWP where the S-SSB is transmitted. In some other aspects, the BS 105 may transmit the S-SSB according to a synchronization raster defined for sidelink. The sidelink synchronization raster can be defined such that the S-SSB may be aligned to a lowest frequency of a corresponding sidelink BWP where the S-SSB is transmitted.

In some aspects, to satisfy a certain OCB, for example, when operating over an unlicensed band, PSCCH/PSCCH transmissions may utilize a frequency-interlaced waveform. When utilizing a frequency interlaced waveform, PSSCH and PSSCH transmissions can be multiplexed in time and/or frequency. To satisfy an OCB in a sidelink slot configured for an S-SSB transmission, a sidelink sync UE 115 may transmit an S-SSB transmission multiplexed with a PSCCH/PSSCH transmission having a frequency interlaced waveform. The PSSCH transmission may include at least one of sidelink data or a CSI-RS. In some aspects, a BS 105 may configure different sidelink resource pools for slots that are associated with S-SSB transmission and for slots that are not associated with S-SSB transmissions. For instance, the BS 105 may configure a first resource pool with a frequency interlace-structure for slots that are not configured for S-SSB transmissions. The first resource pool may include a plurality of frequency interlaces (e.g., distributed RBs), where each frequency interlace may carry a PSCCH/PSSCH transmission. The BS 105 may configure a second resource pool with a subchannel-based structure for slots that are configured for S-SSB transmission. The second resource pool may include a plurality of frequency subchannels (e.g., contiguous RBs), where each subchannel may carry a PSCCH/PSSCH transmission. To satisfy an OCB in a sidelink slot configured for an S-SSB transmission, a sidelink sync UE 115 may transmit an S-SSB transmission multiplexed with a PSCCH/PSSCH transmission. For instance, the S-SSB transmission may be transmitted in frequency resources located at a lower frequency portion of a sidelink BWP and the PSCCH/PSSCH transmission may be transmitted in frequency resources located at higher frequency portion of the sidelink BWP. Mechanisms for multiplexing an S-SSB transmission with a PSSCH/PSSCH transmission to satisfy an OCB are discussed in greater detail herein.

FIG. 2 illustrates an example of a wireless communication network 200 that provisions for sidelink communications according to embodiments of the present disclosure. The network 200 may correspond to a portion of the network 100. FIG. 2 illustrates one BS 205 and five UEs 215 (shown as 215a, 215v, 215c, 215d, and 215e) for purposes of simplicity of discussion, though it will be recognized that embodiments of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115i-k) and the communications over the sidelinks 251 and/or 252 may be C-V2X communications. C-V2X communications may refer to communications between vehicles and any other wireless communication devices in a cellular network.

In some aspects, the BS 205 may configure a sidelink UE 215 as a sidelink sync UE (e.g., the UE 215c). When operating as a sidelink sync UE, the UE 215 may broadcast S-SSBs, which may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications as will be discussed more fully below. Accordingly, other UEs (e.g., the UEs 215d and 215e) that are nearby the UE 215c, but may be out of the coverage of the BS 205 may listen to and synchronize to the S-SSBs and communicate with each other based on the S-SSBs.

Figure 3:
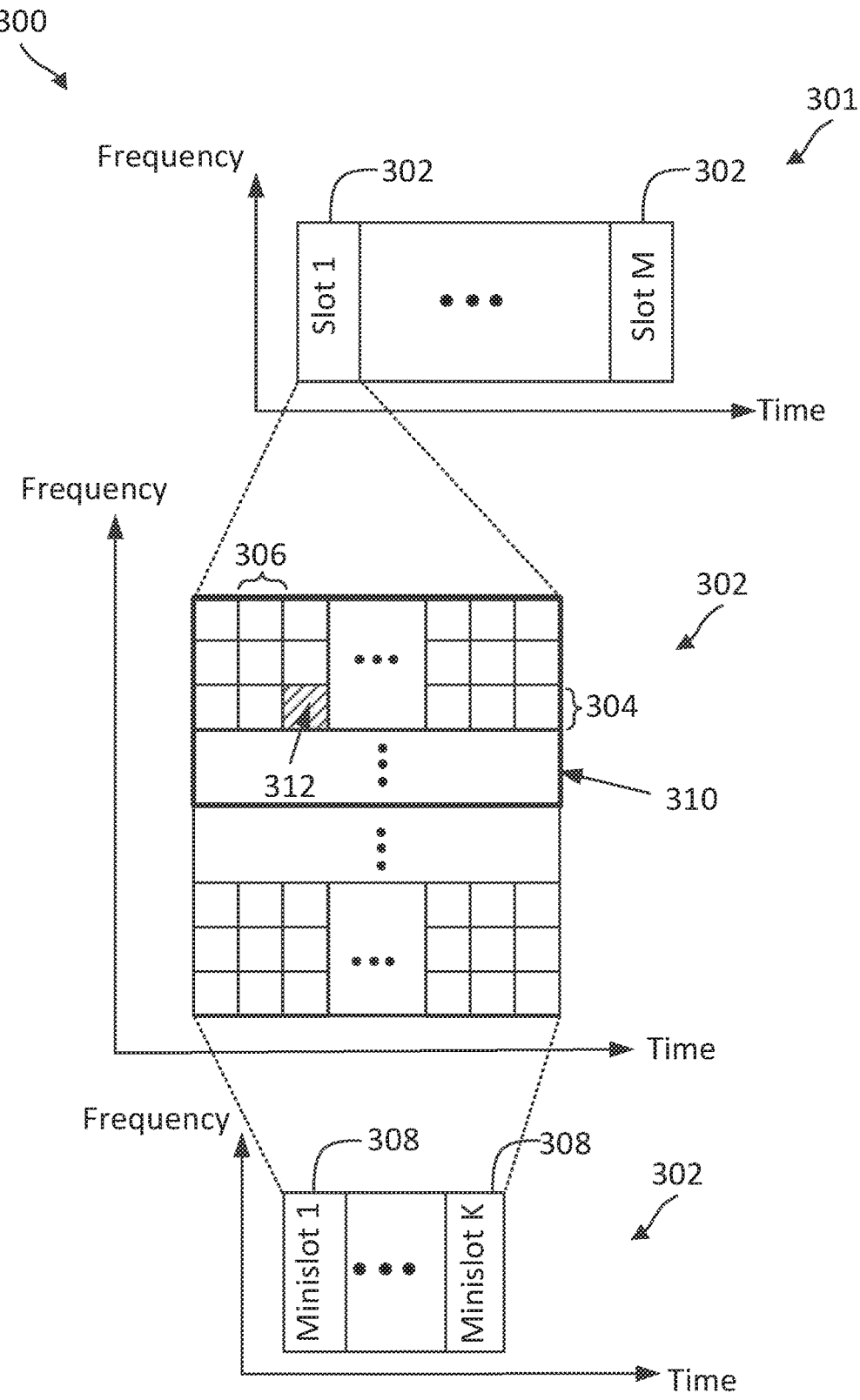
FIG. 3 illustrates a radio frame structure according to some aspects of the present disclosure.

FIG. 3 illustrates a radio frame structure 300 according to some aspects of the present disclosure. The radio frame structure 300 may be employed by BSs such as the BSs 105 and 205 and UEs such as the UEs 115 and 215 in a network such as the networks 100 and/or 200 for communications. In particular, the BS may communicate with the UE using time-frequency resources configured as shown in the radio frame structure 300. In FIG. 3, the x-axes represent time in some arbitrary units and the y-axes represent frequency in some arbitrary units. The transmission frame structure 300 includes a radio frame 301. The duration of the radio frame 301 may vary depending on the aspects. In an example, the radio frame 301 may have a duration of about ten milliseconds. The radio frame 301 includes M number of slots 302, where M may be any suitable positive integer. In an example, M may be about 10.

Each slot 302 includes a number of subcarriers 304 in frequency and a number of symbols 306 in time. The number of subcarriers 304 and/or the number of symbols 306 in a slot 302 may vary depending on the aspects, for example, based on the channel BW, the subcarrier spacing (SCS), and/or the CP mode. One subcarrier 304 in frequency and one symbol 306 in time forms one resource element (RE) 312 for transmission. A resource block (RB) 310 is formed from a number of consecutive subcarriers 304 in frequency and a number of consecutive symbols 306 in time.

In an example, a BS (e.g., BS 105 in FIG. 1 or BS 205 in FIG. 2) may schedule a UE (e.g., UE 115 in FIG. 1 or UE 215 in FIG. 2) for UL and/or DL communications at a time-granularity of slots 302 or mini-slots 308. Each slot 302 may be time-partitioned into K number of mini-slots 308. Each mini-slot 308 may include one or more symbols 306. The mini-slots 308 in a slot 302 may have variable lengths.

For example, when a slot 302 includes N number of symbols 306, a mini-slot 308 may have a length between one symbol 306 and (N−1) symbols 306. In some aspects, a mini-slot 308 may have a length of about two symbols 306, about four symbols 306, or about seven symbols 306. In some examples, the BS may schedule UE at a frequency-granularity of a resource block (RB) 310 (e.g., including about 12 subcarriers 304).

Additionally, the BS may configure a sidelink resource pool including sidelink resources based on the radio frame structures 300 for sidelink communications among sidelink UEs (e.g., the UEs 215). In some instances, the BS may configure a sidelink resource pool using a frequency interlaced-structure, where sidelink resources are defined in units of frequency interlaces each including RBs 310 distributed over a sidelink BWP. Additionally or alternatively, the BS may configure a sidelink resource pool using a subchannel-based structure, where sidelink resources are defined in units of frequency subchannels each including contiguous RBs 310 in a sidelink BWP as will be discussed more fully below.

Figures 4A, 4B, 4C:
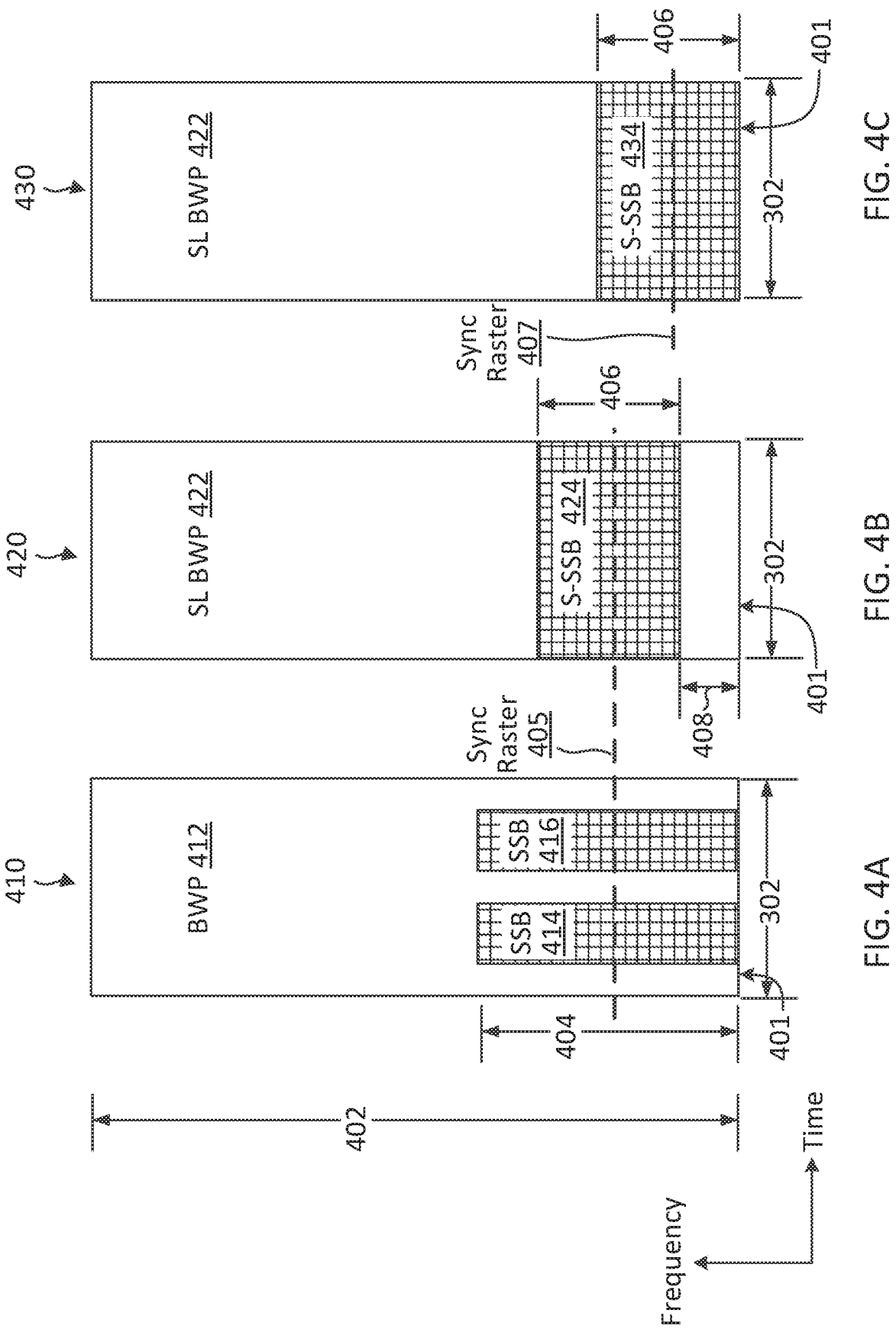
FIG. 4A illustrates a synchronization signal block (SSB) transmission scheme according to some aspects of the present disclosure.
FIG. 4B illustrates a sidelink-synchronization signal block (S-SSB) transmission scheme according to some aspects of the present disclosure.
FIG. 4C illustrates an S-SSB transmission scheme accord-ing to some aspects of the present disclosure.

FIGS. 4A-4C illustrate various mechanisms for S-SSB transmission in relation to SSB transmissions in NR-U. In FIGS. 4A-4C, the x-axes may represent time in some arbitrary units, and the y-axes may represent frequency in some arbitrary units.

FIG. 4A illustrates a SSB transmission scheme 410 according to some aspects of the present disclosure. The scheme 410 may be employed by a BS such as the BSs 105 and 205 and UEs such as the UEs 115 and 215 in a network such as the networks 100 and/or 200 for communications. In particular, the BS may employ the scheme 410 to broadcast SSBs when operating over an unlicensed band. The BS may transmit SSBs in radio frames having a similar structure as the radio frame structure 300 and may use the same reference numerals.

In the illustrated example of FIG. 4A, a BS (e.g., the BSs 105 and/or 205) may configure a BWP 412 in a frequency band 402 for communications with UEs. The frequency band 402 may be at any suitable frequencies (e.g., at about 2.4 GHz, 5 GHz, or 6 GHz). The frequency band 402 may have any suitable BW. In some aspects, the frequency band 402 may be a 20 MHz band in in unlicensed spectrum. For example, the BS may be operating an NR-U network over the 20 MHz band. The BS may broadcast SSBs 414 and 416 in the BWP 412 during a slot 302. Each of SSBs 414 and 416 may include a PSS, an SSS, and a PBCH signal carrying a MIB as discussed above in relation to FIG. 1. The SSBs 414 and 416 may facilitate a UE (e.g., the UEs 115 and/or 215) in synchronizing to the BS and accessing the network. The SSBs 414 and 416 may include substantially similar information. In some instances, the BS may transmit the SSBs 414 and 416 in different beam directions. In some instances, the BS may transmit the SSBs 414 and 416 according to a SSB transmission periodicity, for example, at about 40 ms, 80 ms, or 160 ms.

In some aspects, the frequency band 402 may be a 20 MHz band and may be configured with an SCS of about 30 kHz. Each of the SSBs 414 and 416 may occupy a BW 404 including about 20 RBs (e.g., the RBs 310). The BS may transmit the SSBs 414 and 416 according to a sync raster 405 defined for NR-U operations, for example, centered at the sync raster 405. In some aspects, the NR-U sync raster 405 may be defined such that the SSBs 414 and 416 are aligned to a low frequency edge 401 of the BWP 412, where an SSB 414 or 416 may have 10 RBs above the sync raster 405 and 10 RBs below the sync raster 405. In some aspects, NR-U may define the sync raster 405 over a frequency band, for example, at 20 MHz intervals. In other words, the sync raster 405 may have a periodicity of 20 MHz in frequency. The BS may transmit the SSBs 414 and/or 416 periodically. As such, a UE 115 or a UE 215 seeking to access a network may scan the frequency band according to the sync raster 405 to search for a cell or a BS.

As discussed above, a BS 205 may configure a UE 215 (e.g., the UE 215c) to operate as a sidelink sync UE or provide sidelink system information for other sidelink UEs 215, which may be out of the coverage of the BS 105, to communicate sidelink with each other. The BS 205 may configure the UE 215 to transmit S-SSBs in various frequency configurations, for example, according to an NR-U sync raster as shown in FIG. 4B or according to a new sync raster defined for sidelink as shown in FIG. 4C.

FIG. 4B illustrates an S-SSB transmission scheme 420 according to some aspects of the present disclosure. The scheme 420 may be employed by a BS such as the BSs 105 and 205 and UEs such as the UEs 115 and 215 in a network such as the networks 100 and/or 200 for communications. In particular, the BS may configure a sidelink sync UE 215 to transmit S-SSBs as shown in the scheme 420. In the illustrate example of FIG. 4B, a BS 205 may configure a sidelink sync UE 215 to operate over a sidelink (SL) BWP 422 in the frequency band 402. The BS 205 may also configure the UE 215 to operate as a sidelink sync UE to broadcast S-SSBs 424 to facilitate other sidelink UEs 215 in performing sidelink communications. The BS 205 may configure the UE 215 to transmit the S-SSB 424 in a slot 302 according to a sync raster 405 defined by NR-U. Accordingly, the UE 215 may transmit the S-SSB 424 in the SL BWP 422 centered at the NR-U sync raster 405.

In some aspects, the S-SSB 424 may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some examples, the S-SSB 424 may include a physical sidelink broadcast channel (PSBCH) signal, which may carry a sidelink MIB including a direct frame number (DFN), a TDD configuration, a slot index, an in-coverage indicator, and/or a cyclic redundancy check (CRC). In some aspect, the S-SSB 424 may occupy a smaller frequency BW than the SSBs 414 and 416. For instance, the S-SSB 424 may occupy a BW 406 of about 11 RBs (e.g., the RBs 310) at an SCS of 30 kHz. Additionally, the S-SSB 424 may occupy the entire duration of the slot 302. When the S-SSB 424 is transmitted according to the NR-U sync raster 405 (e.g., centered at the sync raster 405), the S-SSB 424 may have 5.5 RBs above the NR-U sync raster 405 and 5.5 RBs below the NR-U sync raster 405. As such, there is a frequency offset 408 of about 4.5 RBs between lowest frequency edge of the S-SSB 424 and the low frequency edge 401 of the SL BWP 422. In some aspects, the BS 205 may indicate the frequency offset 408 for the S-SSB 424 in a MIB, for example, broadcast a part of the SSB 414 or 416.

FIG. 4C illustrates an S-SSB transmission scheme 430 according to some aspects of the present disclosure. The scheme 430 may be employed by a BS such as the BSs 105 and 205 and UEs such as the UEs 115 and 215 in a network such as the networks 100 and/or 200 for communications. In particular, the BS may configure a sidelink sync UE 215 to transmit S-SSBs as shown in the scheme 430. Similar to the scheme 430, a BS 205 may configure a sidelink sync UE 215 to operate over a sidelink (SL) BWP 422 in the frequency band 402. The BS 205 may also configure the UE 215 to operate as a sidelink sync UE to broadcast S-SSBs to facilitate other sidelink UEs 215 in performing sidelink communications. However, in the scheme 430, the BS 205 may configure a sync raster 407 different from the NR-U sync raster 405 such that an S-SSB may be aligned to the low frequency edge 401 of the SL BWP 422. The sync raster 407 may be referred to as a sidelink sync raster. As shown, the sidelink sync UE 115 transmit an S-SSB 434 centered at the sync raster 407, where the S-SSB 434 is aligned to the low frequency edge 401 of the SL BWP 422. The S-SSB 434 may be similar to the S-SSB 424. For instance, the S-SSB 434 may also occupy a frequency BW 406 of about 11 RBs and the entire duration of a slot 302 and may include similar sidelink system information as discussed above in FIG. 4B.

As discussed above, to satisfy a certain OCB, for example, when operating over an unlicensed band, sidelink communications may utilize a frequency-interlaced waveform. Thus, in some aspects, a BS 205 configure a sidelink resource pool based on a frequency-interlaced structure as shown in FIG. 5 for sidelink communications between sidelink UEs 215.

FIG. 5 illustrates a sidelink resource allocation scheme 500 based on a frequency-interlaced waveform according to some aspects of the present disclosure. The scheme 500 may be employed by a BS such as the BSs 105 and 205 and UEs such as the UEs 115 and 215 in a network such as the networks 100 and/or 200. In particular, a BS 205 may configure sidelink UEs 215 with sidelink resources in units for frequency interlaces to provision for sidelink transmissions with frequency interlaced waveforms satisfying an OCB in the frequency band 502 as shown in the scheme 500. The frequency band 502 may be located at any suitable frequencies (e.g., at about 3 GHz, 5 GHz, 6 GHz, or 60 GHz), and may have any suitable BW (e.g., about 10 MHz, 20 MHz). The frequency band 402 may also be configured with any suitable SCS (e.g., about 15 kHz, 30 kHz, 60 Hz, 120 kHz, or 240 kHz). In some aspects, the frequency band 502 may be located at about 5 GHz or 6 GHz and may have a BW of about 20 MHz configured with an SCS of about 30 kHz.

As show, the frequency band 502 is partitioned into a plurality of frequency interlaces 508 shown as $508_{I(0)}$ to $508_{(M-1)}$, where M is a positive integer. Each frequency interlace $508_{I(i)}$ may include K plurality of RBs 510 (e.g., the RBs 310) evenly spaced over the frequency band 502, where K is a positive integer and i may vary between 0 to M−1. In other words, the RBs 510 in a particular frequency interlace $508_{I(i)}$ are spaced apart from each other by at least one other RB 510. The frequency interlace $508_{I(0)}$ as shown by the pattern filled boxes comprises RBs 510 from clusters $504_{C(0)}$ to $504_{C(K-1)}$. The values of K and M may vary based on several factors, such as the bandwidth, the SCS, and/or the PSD limitation of the frequency band 502, as described in greater detail below.

A group of M localized RBs 510 forms a cluster 504. As shown, the frequency interlaces $508_{I(0)}$ to $508_{(M-1)}$ form K clusters $504_{C(0)}$ to $504_{C(K-1)}$. Each RB 510 may span about twelve contiguous subcarriers 512 in frequency and a time period 514, which may correspond to a slot 302 as shown in FIG. 3. The subcarriers 512 are indexed from 0 to 11. The subcarriers 512 are also referred to as resource elements (REs). The time period 514 may span any suitable number of OFDM symbols 506. In some aspects, the time period 514 may correspond to one transmission time interval (TTI), which may include about fourteen OFDM symbols 506.

The number of clusters 504 or the value of K may be dependent on the amount of frequency distribution required to maintain a certain BW occupancy. As an example, the scheme 500 may divide the frequency band 502 into about ten clusters 504 (e.g., K=10) and distribute an allocation over the ten clusters 504 to increase a frequency occupancy of the allocation. In an aspect, the frequency band 502 may have a bandwidth of about 20 MHz and each subcarrier 512 may span about 15 kHz in frequency. In such an aspect, the frequency band 502 may include about ten frequency interlaces 508 (e.g., M=10). For example, an allocation may include one frequency interlace 508 having ten distributed or equally spaced RBs 510. Compared to an allocation with a single RB or ten localized RBs, the interlaced allocation with the ten distributed RBs 510 allows a UE to transmit with a higher BW occupancy.

In another aspect, the frequency band 502 may have a bandwidth of about 10 MHz and each subcarrier 512 may span about 15 kHz in frequency. In such an aspect, the frequency band 502 may include about five frequency interlaces 508 (e.g., M=5). Similarly, an allocation may include one frequency interlace 508 having ten distributed RBs 510. The interlaced allocation with the ten distributed RBs may allow for a wider BW occupancy than an allocation with a single RB or ten localized RBs.

In another aspect, the frequency band 502 may have a bandwidth of about 20 MHz and each subcarrier 512 may span about 30 kHz in frequency (e.g., an SCS of 30 kHz). In such an aspect, the frequency band 502 may include about five frequency interlaces 508 (e.g., M=5). Similarly, an allocation may include one frequency interlace 508 having ten distributed RBs 510. The interlaced allocation with the ten distributed RBs may allow for a wider BW occupancy than an allocation with a single RB or ten localized RBs.

In some aspects, the RBs 510 are physical resource blocks (PRBs) and each frequency interlace 508 may include PRBs uniformly spaced in the frequency band 502.

In the scheme 500, a transmitting sidelink UE 215 (e.g., the UE 215c of FIG. 2) may select one or more frequency interlaces 508 for sidelink communication with another sidelink UE 215 (e.g., the UE 215d of FIG. 2). As an example, the transmitting sidelink UE 215 selects the frequency interlace $508_{I(0)}$ shown by the patterned boxes for sidelink communication with the UE 215d. In some other examples, the transmitting sidelink UE 215 may select a different frequency interlace $508_{I(m)}$, where m may be between 1 and M−1, for the sidelink communication. Additionally, the transmitting sidelink UE 215 may use any suitable number of frequency interlaces 508 for the sidelink communication, for example, between 1 to M number of frequency interlaces 508.

The sidelink communication over the frequency interlace $508_{I(0)}$ may include sidelink data and SCI. The sidelink data may be communicated via a PSSCH. The SCI may be communicated via a PSCCH. The SCI may carry information or parameters related to the transmission of the PSSCH. In some aspects, the PSCCH and the PSCCH may be multiplexed within the frequency interlace $508_{I(0)}$ using FDM. For instance, the PSCCH may occupy a lowest frequency RB 510 and a highest frequency RB 510 of the frequency interlace $508_{I(0)}$ and the PSSCH may occupy remaining RBs 510 of the frequency interlace $508_{I(0)}$ as will be discussed more fully below in FIGS. 6 and 8. In some other aspects, the PSCCH and the PSCCH may be multiplexed within the frequency interlace $508_{I(0)}$ using TDM. For instance, the PSSCH and the PSSCH mapped different time periods in each RB 510 of the frequency interlace 508$_{I(0)}$ as will be discussed more fully below in FIGS. 7 and 9.

FIGS. 6-9 illustrate various mechanisms for multiplexing S-SSB transmissions as shown in the schemes 420 and 430 with PSCCH/PSSCH transmissions using frequency interlaces as shown in the scheme 500 to satisfy an OCB requirement of a frequency band. The schemes 600, 700, 800, and 900 in FIGS. 6, 7, 8, and 9, respectively, may be employed by sidelink UEs such as the UEs 115 and/or 215 in a network such as the networks 100 for multiplexing an S-SSB transmission with a PSCCH/PSSCH transmission, for example, to meet an OCB requirement of a frequency band. FIGS. 6-9 are illustrated using the S-SSB transmission schemes 420 and/or 430 and the frequency interlaced sidelink resource structure shown in the scheme 500 and may use the same reference numerals as in FIGS. 4B-4C and 5. Additionally, the x-axes represent time in some arbitrary units, and the y-axes represent frequency in some arbitrary units. Further, FIGS. 6-9 illustrate the S-SSB transmission and the PSCCH/PSSCH transmission multiplexed by a sidelink sync UE in a slot in separate views for clarity of illustration.

FIG. 6 illustrates an S-SSB and PSCCH/PSSCH multiplexing scheme 600 according to some aspects of the present disclosure. In the scheme 600, a BS 205 may configure a SL BWP 422 over the frequency band 502. The BS 205 may configure a sidelink resource pool in the SL BWP 422. The sidelink resource pool may include a plurality of slots 514 in time and a plurality of frequency interlaces 508 in the frequency band 502. The slots 514 can be referred to as sidelink slots. The BS 205 may configure some slots 514 for S-SSB transmissions, for example, with a periodicity of about 40 ms, 80 ms, 160 ms, 240 ms, or any suitable periodicity. The BS 205 may configure a sidelink sync UE 215 to transmit an S-SSB 424 in a slot 514$a$ according to the NR-U sync raster 405 as shown by the view 601, for example, using the scheme 420 shown in FIG. 4B.

To satisfy an OCB requirement of the frequency band 502, the sidelink sync UE 215 may transmit a sidelink transmission (including a PSCCH transmission 610 and a PSSCH transmission 620) in a frequency interlace 508 at the same time as the S-SSB 424 transmission during the sidelink slot 514$a$ by multiplexing the sidelink transmission with the S-SSB 424 transmission as shown by the view 602. For purposes of simplicity of discussion, FIG. 6 illustrates an example of the frequency band 502 having a 20 MH BW with an SCS of about 30 kHz. Additionally, the frequency band 502 is configured with 10 clusters 504 (e.g., K=10) with five interlaces 508. Thus, each frequency interlace 508 may include ten RBs (e.g., the RBs 510). However, the scheme 600 may be applied to a frequency interlace with any suitable number of RBs 510 and/or any SCS. The RBs in a frequency interlace 508$_{I(4)}$ are shown as RB(0) to RB(9).

In the illustrated example of FIG. 6, the sidelink sync UE 215 transmits the sidelink transmission including a PSCCH transmission 610 and a PSSCH transmission 620 in the frequency interlace 508$_{I(4)}$. It should be understood that in other examples sidelink sync UE 215 may transmit the PSCCH transmission 610 and PSSCH transmission 620 in another frequency interlace 508 (e.g., the frequency interlace 508$_{I(1)}$, the frequency interlace 508$_{I(2)}$, and/or the frequency interlace 508$_{I(3)}$). In the scheme 600, the sidelink sync UE 215 multiplexes the PSCCH transmission 610 and the PSSCH transmission 620 in frequency. As shown, the PSCCH transmission 610 occupies the edges of the frequency interlace 508$_{I(4)}$ (e.g., at a highest frequency RB(0)

and a lowest frequency RB (9)), and the PSSCH transmission 620 occupies remaining RBs (e.g., RB(1) to RB(8)) of the frequency interlace 508$_{I(4)}$. The PSSCH transmission 620 may include sidelink data, for example, for another sidelink UE (e.g., the UEs 115 and/or 215) and the PSCCH transmission 610 may include SCI associated with the transmission of the sidelink data. In some instances, the SCI may carry reservation and/or scheduling information for the PSSCH transmission 620.

As discussed above, the S-SSB 424 transmission may occupy about eleven RBs 510 with an offset 408 of 4.5 RB 510 from the low frequency edge 401 of the SL BWP 422. When there are five frequency interlaces 508 (frequency interlaces 508$_{I(0)}$ to 508$_{I(4)}$) in the SL BWP 422, the highest frequency RB 510 (in the cluster 504$_{C(0)}$) and the lowest frequency RB 510 (in the cluster 504$_{C(9)}$) of the frequency interlaces 508$_{I(1)}$ to 508$_{I(4)}$ may not overlap with a frequency resource used by the S-SSB 424 transmission. As such, the sidelink sync UE 215 may select any of the frequency interlaces 508$_{I(1)}$ to 508$_{I(4)}$ for transmission without collision handling for PSCCH transmission (e.g., PSCCH transmission 610). However, the lowest frequency RB 510 of the frequency interlaces 508$_{I(0)}$ may overlap with a frequency resource used by the S-SSB 424 transmission. In some aspects, the sidelink sync UE 215 may avoid selecting the frequency interlaces 508$_{I(0)}$ for multiplexing with the S-SSB 424 transmission. Accordingly, the sidelink sync UE 215 may select a frequency interlace 508 from the plurality of frequency interlaces 508 in the SL BWP 422 for communicating a sidelink transmission (including the PSCCH transmission 610 and the PSSCH transmission 620) based on the lowest frequency RB 510 of the selected frequency interlace 508 being non-overlapping with a frequency resource used for the S-SSB 424 transmission.

Since the S-SSB 424 transmission occupies eleven RBs 510, the S-SSB 424 transmission may collide with a PSSCH transmission 620 in each frequency interlace 508. In other words, there will be a collision between a PSSCH transmission 620 and the S-SSB 424 transmission irrespective of which frequency interlace 508 is selected by the sidelink sync UE 215. When the SCS is 30 kHz, the collision may be in about 2-3 RBs 510 for any of the frequency interlaces 508. When the SCS is 15 kHz, the collision may be in about 1-2 RBs 510 for any of the frequency interlaces 508. As shown by the dashed box 606, a portion of the PSSCH transmission 620 in the frequency interlaces 508$_{I(4)}$ overlaps with frequency resources used by the S-SSB 424 transmission. To avoid colliding with the S-SSB 424 transmission, the sidelink sync UE 215 may puncture the PSSCH transmission 620 at RBs 510 that are at least partially overlapping with a frequency resource used by the S-SSB 424 transmission. For instance, the sidelink sync UE 215 may perform the puncturing by dropping transmission of the PSSCH transmission 620 at RBs 510 that are at least partially overlapping with a frequency resource used by the S-SSB 424 transmission.

Alternatively, the sidelink sync UE 215 may rate-match the PSSCH transmission 620 around RBs 510 that are at least partially overlapping with a frequency resource used by the S-SSB 424 transmission. For instance, the sidelink sync UE 215 may rate-match the PSSCH transmission 620 by adjusting or extracting a number of coded bits matching a number of bits that may be carried by the PSSCH transmission 620 excluding RBs 510 that are at least partially overlapping with the S-SSB 424 transmission. When the sidelink sync UE 215 and a receiving sidelink UE (e.g., the UEs 115 and/or 215) of the PSSCH transmission 620 are in the coverage of a BS 205, the receiving sidelink UE may be aware of the S-SSB 424 transmission in the slot 514*a*, and thus may perform PSSCH decoding based on a rate-match around RBs 510 that at least partially overlapping with the S-SSB 424 transmission. However, in some instances, the receiving sidelink UE may not have full knowledge of the S-SSB transmission pattern, and thus may not be aware that the slot 514*a* is configured for an S-SSB transmission. For instance, the receiving sidelink UE may be configured with different S-SSB transmission parameters than the sidelink sync UE 215. For example, the sidelink sync UE 215 and the receiving sidelink UE may be configured with different sl-NumSSB-WithinPeriod parameters indicating different number of S-SSBs within a period. In some aspects, a sidelink UE (e.g., the sidelink sync UE 215 and/or the receiving sidelink UE) may receive an sl-NumSSB-Within-Period parameter via an RRC configuration from a BS (e.g., while in coverage of the BS). In some other aspects, a sidelink UE (e.g., the sidelink sync UE 215 and/or the receiving sidelink UE) may be preconfigured with a default profile including an sl-NumSSB-WithinPeriod parameter (e.g., by a manufacturer of the UE during manufacturing time). When the receiving sidelink UE is not aware of the S-SSB transmission in the slot 514*a*, the receiving sidelink UE may not decode the PSSCH transmission 620 based on a rate-match, and thus may fail the PSSCH decoding. To assist the receiving sidelink UE in performing rate-match for the PSSCH decoding, the sidelink sync UE 215 may include rate-match information in SCI transmitted in the PSCCH transmission 610. For instance, the SCI (e.g., a stage one SCI) may include an indication indicating that a rate-match is applied to the PSSCH transmission 620 and/or the RBs 510 where the rate-match is applied.

FIG. 7 illustrates an S-SSB and PSCCH/PSSCH multiplexing scheme 700 according to some aspects of the present disclosure. The scheme 700 is substantially similar to the scheme 600. For instance, a BS 205 may configure a sidelink sync UE 215 to transmit an S-SSB 424 in a slot 514*a* according to the NR-U sync raster 405 as shown by the view 701, for example, using the scheme 420. Additionally, the sidelink sync UE 215 may transmit a sidelink transmission (including a PSCCH transmission 610 and a PSSCH transmission 620) in a frequency interlace 508 at the same time as the S-SSB 424 transmission during the sidelink slot 514*a* to satisfy an OCB requirement of the frequency band 502. However, in the scheme 700, the sidelink sync UE 215 may multiplex the PSCCH transmission 610 and the PSSCH transmission 620 in time instead of in frequency as in the scheme 600. As shown by the view 702, the sidelink sync UE 215 transmits the PSCCH transmission 610 during a beginning time period 703 of the slot 514*a* and the PSSCH transmission 620 during a subsequent time period 704 in the slot 514*a*. The time periods 703 and 704 may be consecutive time periods, for example, with no gap between the time period 703 and the time period 704.

Since the PSCCH transmission 610 and PSSCH transmission 620 are time multiplexed in each RB 510 of a frequency interlace 508, the PSCCH transmission 610 and the PSSCH transmission 620 in any frequency interlace 508 in the resource pool will collide with the S-SSB 424 transmission in the slot 514*a*. When the SCS is 30 kHz, the collision may be in about 2-3 RBs 510 for any of the frequency interlaces 508. When the SCS is 15 kHz, the collision may be in about 1-2 RBs 510 for any of the frequency interlaces 508. As shown by the dashed box 706, a portion of the PSCCH transmission 610 and PSSCH transmission 620 in the frequency interlaces 508$_{I(4)}$ overlaps with frequency resources used by the S-SSB 424 transmission.

To avoid collision between the PSCCH transmission 610 and the S-SSB 424 transmission, the sidelink sync UE 215 may puncture the PSCCH transmission 610 at RBs 510 that are at least partially overlapping with a frequency resource used by the S-SSB 424 transmission. Alternatively, the sidelink sync UE 215 may rate-match the PSCCH transmission 610 around RBs 510 that are at least partially overlapping with a frequency resource used by the S-SSB 424 transmission. In some instances, a receiving sidelink UE (e.g., the UEs 115 and/or 215) of the PSCCH transmission 610 may not have full knowledge of the S-SSB transmission pattern, and thus may not be aware that the slot 514*a* is configured for an S-SSB transmission. As such, when a rate-match is applied to the PSCCH transmission 610, the receiving sidelink UE may fail to decode the PSCCH transmission 610. In some aspects, the BS 205 may avoid scheduling a PSCCH transmission 610 in control channel elements (CCEs) overlapping with a frequency resource used by the S-SSB 424 transmission. A CCE may be a smallest time-frequency resource unit used for defining a control channel resource. A CCE may include six resource element groups (REGs), where a REG is defined as on physical RB in one symbol. SCI may be transmitted in an aggregation four CCEs, eight CCEs, or sixteen CCEs.

To avoid collision between the PSSCH transmission 620 and the S-SSB 424 transmission, the sidelink sync UE 215 may perform similar puncturing or rate-match on the PSSCH transmission 620 as discussed above in the scheme 600 with reference to FIG. 6. Additionally, if the sidelink sync UE 215 applies a rate-match to the PSSCH transmission 620, the sidelink sync UE 215 may also include rate-match operation information in the corresponding PSCCH transmission 610 (e.g., in SCI) to assist a receiving sidelink UE in performing PSSCH rate-match as discussed above as discussed above in the scheme 600 with reference to FIG. 6.

FIG. 8 illustrates an S-SSB and PSCCH/PSSCH multiplexing scheme 800 according to some aspects of the present disclosure. The scheme 800 is substantially similar to the scheme 600 and is described using the same frequency interlace structured sidelink resources as in the scheme 600. For instance, a BS 205 may configure a similar sidelink resource pool including a plurality of slots 514 in time and a plurality of frequency interlaces 508 (for frequency-multiplexed PSCCH and PSSCH transmissions) in the SL BWP 422 within the frequency band 502 as in the scheme 600. However, the BS 205 may configure a sidelink sync UE 215 to transmit an S-SSB 434 in a slot 514*a* according to the NR-U sync raster 407 as shown by the view 801, for example, using the scheme 430 shown in FIG. 4C. To satisfy an OCB requirement of the frequency band 502, the sidelink sync UE 215 may also transmit a sidelink transmission in a frequency interlace 508 at the same time as the S-SSB 434 transmission in the sidelink slot 514*a*.

Since the sidelink sync UE 215 may transmit the S-SSB 434 aligned to a low frequency edge 401 of the SL BWP 422 and the S-SSB 434 occupies 11 RBs 510, the S-SSB 434 transmission may collide with the lowest frequency RBs 510 (e.g., RB(9)) of each frequency interlace 508. As discussed above in FIG. 6, for a frequency-multiplexed PSCCH and PSSCH transmission, the PSCCH transmission is mapped to the lowest frequency RB and the highest frequency RB of a frequency interlace 508. As such, a PSCCH transmission in any of the frequency interlaces 508 may collide with the S-SSB 434 transmission. To avoid impacting the performance of a PSCCH transmission, the sidelink sync UE 215 may adjust the resource mapping for the PSCCH to a next cluster 504 that does not overlap with the S-SSB 434 transmission. In some aspects, instead of mapping the PSCCH and the PSSCH to the full interlace 508$_{I(4)}$, the sidelink sync UE 215 may remap the PSCCH and the PSSCH to a portion of the frequency interlace 508$_{I(4)}$ (e.g., a partial interlace). For instance, the frequency interlace 508$_{I(4)}$ includes a plurality of RBs 510 spaced apart from each other by one other RB 510 in the frequency band 502. The sidelink sync UE 215 may determine a subset of the plurality of RBs 510 (e.g., RB(0) to RB(6) shown by the reference numeral 804) in the frequency interlace 508$_{I(4)}$ that are non-overlapping with frequency resources used by the S-SSB 434 transmission. The sidelink sync UE 215 may transmit the PSCCH transmission 610 in a lowest frequency RB 510 (e.g., RB(6)) and a highest frequency RB 510 (e.g., RB(0)) of the subset 804 of the plurality of RBs, and transmit the PSSCH transmission 620 in remaining RBs 510 of the subset of the plurality of RBs 510 as shown by the view 802.

A receiving sidelink UE (e.g., the UEs 115 and/or 215) of the PSSCH transmission 620 may or may not be aware of whether the sidelink slot 514*a* is configured for an S-SSB transmission. If the receiving sidelink UE is aware of the S-SSB transmission configured for the sidelink slot 514*a*, the receiving sidelink UE may monitor for SCI according to the remapped PSCCH in the lowest frequency RB 510 and the highest frequency RB 510 of the subset 804 of the plurality of RBs 510. If the receiving sidelink UE does not have full knowledge of the S-SSB transmission configured for the sidelink slot 514*a*, the receiving sidelink UE may monitor for SCI in the sidelink slot 514*a* by performing SCI decoding in the lowest frequency RB 510 (e.g., RB(0)) and the highest frequency RB 510 (e.g., RB(6)) of the subset 804 of the plurality of RBs 510 (e.g., the partial frequency interlace) and performing SCI decoding in the lowest frequency RB 510 (e.g., RB(0)) and the highest frequency RB 510 (e.g., RB(9)) of the plurality of RBs 510 (e.g., the full frequency interlace). In other words, the receiving sidelink UE may perform the additional SCI decoding in each slot 514 based on the resource mapping for the partial frequency interlace even though the partial frequency interlace configuration may occur occasionally based on the S-SSB 434 transmission periodicity.

FIG. 9 illustrates an S-SSB and PSCCH/PSSCH multiplexing scheme 900 according to some aspects of the present disclosure. The scheme 900 is substantially similar to the scheme 700. For instance, a BS 205 may configure a similar sidelink resource pool including a plurality of slots 514 in time and a plurality of frequency interlaces 508 (for time-multiplexed PSCCH and PSSCH transmissions) in the SL BWP 422 within the frequency band 502 as in the scheme 700. However, the BS 205 may configure a sidelink sync UE 215 to transmit an S-SSB 434 in a slot 514*a* according to the NR-U sync raster 407 as shown by the view 901, for example, using the scheme 430 shown in FIG. 4C. To satisfy an OCB requirement of the frequency band 502, the sidelink sync UE 215 may also transmit a sidelink transmission in a frequency interlace 508 at the same time as the S-SSB 434 transmission in the sidelink slot 514*a*. Similar to the scheme 700, the sidelink sync UE 215 transmits the PSCCH transmission 610 during a beginning time period 703 of the slot 514*a* and the PSSCH transmission 620 during a subsequent time period 704 in the slot 514*a* as shown by the view 902.

Since the PSCCH transmission 610 and PSSCH transmission 620 are time multiplexed in each RBs 510 of the frequency interlace 508, the PSCCH transmission 610 and the PSSCH transmission 620 in any frequency interlace 508 in the resource pool may collide with the S-SSB 434 transmission in the slot 514*a*. transmission irrespective of which frequency interlace 508 is selected by the sidelink sync UE 215. When the SCS is 30 kHz, the collision may be in about 2-3 RBs 510 for any of the frequency interlaces 508. When the SCS is 15 kHz, the collision may be in about 1-2 RBs 510 for any of the frequency interlaces 508. As shown by the dashed box 906, the PSCCH transmission 610 and PSSCH transmission 620 in the frequency interlaces 508$_{I(4)}$ overlaps with frequency resources used by the S-SSB 434 transmission.

To avoid collision with the S-SSB 434 transmission, the sidelink sync UE 215 may perform puncturing or rate-match to the PSCCH transmission 610 and/or PSSCH transmission 620 as discussed above in the scheme 700 with reference to FIG. 7. In some aspects, the BS 205 may avoid scheduling a PSCCH transmission 610 in CCEs that overlap with a frequency resource used by the S-SSB 434 transmission as discussed above.

In some aspects, legacy or subchannel-based PSCCH/PSSCH transmissions, which occupy contiguous RBs (e.g., the RBs 310 and 510) may have better compatibility with S-SSB transmissions. For instance, a sidelink sync UE 215 may select a subchannel that is non-overlapping with frequency resources used for an S-SSB transmission instead of having to apply puncturing or rate-match to a PSCCH transmission and/or a PSSCH transmission in a frequency interlace waveform PSCCH/PSSCH transmission. Accordingly, a BS 205 may configure different resource pools for different sidelink slots. For instance, the BS 205 may configure a frequency interlace structured resource pool for sidelink slots that are not associated with S-SSB transmission and a subchannel-based resource pool for sidelink slots that are associated with S-SSB transmissions as discussed below in FIG. 10.

FIG. 10 illustrates an S-SSB and PSCCH/PSSCH multiplexing scheme 1000 according to some aspects of the present disclosure. The scheme 1000 may be employed by sidelink UEs such as the UEs 115 and/or 215 in a network such as the networks 100 for multiplexing an S-SSB transmission with a PSCCH/PSSCH transmission, for example, to meet an OCB requirement of a frequency band. In FIG. 10, the x-axis represents time in some arbitrary units, and the y-axis represents frequency in some arbitrary units. The scheme 1000 is described using the same frequency interlaced resource structure as in the scheme 500 and may use the same reference numerals as in FIG. 5 for simplicity's sake.

In the scheme 1000, a BS 205 may configure a resource pool 1010 and a resource pool 1020 in a SL BWP 422 over the frequency band 502. The BS 205 may configure the resource pool 1010 with a frequency interlaced-structure for slots 514*c* that are not configured for S-SSB transmissions. Although FIG. 10 illustrates one slot 514*c* in the resource pool 1010, it should be understood that the resource pool 1010 may include many more slots 514*c* (e.g., 2, 3, 4, 5 or more). The resource pool 1010 may include a plurality of frequency interlaces 508), where each frequency interlace 508 may carry a PSCCH transmission 610 and a PSSCH transmission 620. Although FIG. 10 illustrates the PSCCH transmission 610 and the PSSCH transmission 620 multiplexed in frequency within a frequency interlace 508, it should be understood that in other examples the PSCCH transmission 610 and the PSSCH transmission 620 may be multiplexed in time within a frequency interlace 508 as in the schemes 700 and 900 discussed above in relation to FIGS. 7 and 9, respectively.

The BS 205 may configure the resource pool 1020 with a subchannel-based structure for slots 514d that are configured for S-SSB transmission. Although FIG. 10 illustrates one slot 514d in the resource pool 1020, it should be understood that the resource pool 1020 may include many more slots 514d (e.g., 2, 3, 4, 5 or more). The slots 514d may have a periodicity corresponding to an S-SSB transmission periodicity (e.g., repeating at about every 40 ms, 80 ms, or 160 ms). The resource pool 1020 may include a plurality of frequency subchannels 1022 (e.g., contiguous RBs 510), where each subchannel 1022 may carry a PSCCH transmission 610 and a PSSCH transmission 620 as shown by the expanded view 1002. Although FIG. 10 illustrates the PSCCH transmission 610 and the PSSCH transmission 620 multiplexed in time within a subchannel 1022, it should be understood that in other examples the PSCCH transmission 610 and the PSSCH transmission 620 may be multiplexed in time and/or frequency within a subchannel 1022.

A sidelink sync UE 215 may switch between the two resource pools 1010 and 1020 for sidelink communications depending on whether a slot is configured for an S-SSB transmission or not. For instance, at block 1030, the sidelink sync UE 215 determines whether a sidelink slot is configured for an S-SSB transmission (e.g., the S-SSB 424 or 434). If the sidelink slot is not configured for an S-SSB transmission, the sidelink sync UE 215 may select a frequency interlace 508 (e.g., the frequency interlace $508_{I(4)}$) from the resource pool 1010 as indicated by the arrow 1004 and transmit a PSCCH transmission 610 and a PSSCH transmission 620 in the selected frequency interlace 508.

However, if the sidelink sync UE 215 determines that the sidelink slot is configured for an S-SSB transmission, the sidelink sync UE 215 may utilize the resource pool 1020 as indicated by the arrow 1006. The sidelink sync UE 215 may transmit an S-SSB 434 according to the sidelink sync raster 407 in the slot 514d. To satisfy an OCB requirement 1008 of the frequency band 502, the sidelink sync UE 215 may select a frequency subchannel 1022 in a higher frequency portion of the SL BWP 422 and transmit a PSCCH transmission 610 and a PSSCH transmission 620 in the selected frequency subchannel 1022. For instance, in a 5 GHz unlicensed band, ETSI regulations impose an OCB to at least 70%.

In some aspects, the BS 205 may configure the resource pool 1020 with subchannels 1022 (shown as subchannel #3, #2, #1, and #0) at the highest frequency portion of the SL BWP 422 that may guarantee the OCB requirement 1008. For instance, a sidelink sync UE 215 may select any of the four subchannels 1022 for multiplexing a PSCCH transmission 610 and a PSSCH transmission 620 with the S-SSB 434 transmission.

In some other aspects, the BS 205 may configure the resource pool 1020 with multiple subchannels 1022 without considering any OCB requirement of the frequency band 502. Thus, the sidelink sync UE 215 may select a frequency subchannel 1022 from the multiple subchannels 1022 by considering the OCB requirement 1008. For instance, the sidelink sync UE 215 may provide a higher priority to a frequency subchannel 1022 at a higher frequency when selecting a frequency channel 1022 for multiplexing a PSCCH transmission 610 and a PSSCH transmission 620 with an S-SSB transmission to meet the OCB requirement 1008. For example, the frequency subchannel #3 1022 may have a higher priority than the frequency subchannel #2 1022 for the selection.

In some aspects, when a monitoring sidelink UE (e.g., the UEs 115 and/or 215) is aware of the slots 514d configured for the S-SSB 434 transmission, the monitoring sidelink UE may determine whether to monitor the resource pool 1010 or the resource pool 1020 for SCI decoding depending on whether a sidelink slot is configured for an S-SSB transmission or not. For instance, if a sidelink slot (e.g., the slot 514d) is configured for an S-SSB transmission, the monitoring sidelink UE may decode for SCI in the resource pool 1020. However, if a sidelink slot (e.g., the slot 514c) is not configured for an S-SSB transmission, the monitoring sidelink UE may decode for SCI in the resource pool 1010. In some instances, a monitoring sidelink UE may not have full knowledge of the S-SSB transmission configuration, and thus may perform SCI decoding in the resource pool 1010 and the resource pool 1020 for each sidelink slot.

FIG. 11 illustrates an S-SSB and PSCCH/PSSCH multiplexing scheme 1100 according to some aspects of the present disclosure. The scheme 1100 may be employed by sidelink UEs such as the UEs 115 and/or 215 in a network such as the networks 100 for multiplexing an S-SSB transmission with a PSCCH/PSSCH transmission, for example, to meet an OCB requirement of a frequency band. In FIG. 11, the x-axis represents time in some arbitrary units, and the y-axis represents frequency in some arbitrary units. The scheme 1100 is described using the same frequency interlaced resource structure as in the scheme 500 and may use the same reference numerals as in FIG. 5 for simplicity's sake. The scheme 1100 is substantially similar to the scheme 1000. For instance, a BS 205 may configure the resource pool 1010 in the SL BWP 422 with a frequency interlaced structure for sidelink slots 514c that are not configured for S-SSB transmissions and another resource pool 1120 in the SL BWP 422 based on a subchannel-based structure with for sidelink slots 514d that are configured for S-SSB transmissions. However, the subchannel-based resource pool 1120 includes a single subchannel on the upper edge of the SL BWP 422 instead of multiple subchannels 1022 as in the scheme 1000.

Similar to the scheme 1000, a sidelink sync UE 215 may switch between the two resource pools 1010 and 1020 for sidelink communications depending on whether a slot is configured for an S-SSB transmission or not. When the sidelink sync UE 215 transmits an S-SSB 434 in the a sidelink slot 514d, the sidelink sync UE 215 may transmit a PSCCH transmission 610 and a PSSCH transmission 620 in the subchannel 1102 at the same time as the S-SSB 434 so that an OCB requirement of the frequency band 502 may be met.

Similar to the scheme 1000, a monitoring sidelink UE (e.g., the UEs 115 and/or 215) that is aware of the sidelink slots 514d configured for S-SSB transmissions may monitor for SCI in the resource pool 1120 during the sidelink slots 514d and may monitor for SCI in the resource pool 1010 for other sidelink slots 514c that are not configured for S-SSB transmissions. On the other hand, a monitoring sidelink UE that may not have knowledge of which sidelink slots are configured S-SSB transmissions may monitor for SCI in the resource pools 1010 and 1120, for example, by performing blind SCI decoding in both the resource pools 1010 and 1120.

While the schemes 1000 and 1110 are illustrated using the S-SSB transmission scheme 430 of FIG. 4C, the schemes 1000 and 1110 may be applied with the S-SSB transmission scheme 420 of FIG. 4B. In some aspects, a BS 205 may determine a maximum number sidelink resource pools (e.g., the pools 1010, 1020, and 1120) based a UE capability. For instance, the BS 205 may determine whether to configure separate resource pools for sidelink slots 514c (not configured for S-SSB transmissions) and sidelink slots 514d (configured for S-SSB transmissions) based on the capability of the sidelink sync UE 215 and/or other sidelink UEs 215 that may utilize the sidelink resource pools.

In some aspects, a sidelink sync UE 215 may not have sidelink data for transmission in the same sidelink slot where an S-SSB is transmitted. To satisfy an OCB requirement, the sidelink sync UE 215 may transmit a CS-RS with a frequency interlaced waveform using a frequency interlace 508, for example, in a PSSCH of the frequency interlace 508 as shown in FIG. 12 below.

FIG. 12 illustrates an S-SSB and PSCCH/PSSCH multiplexing scheme 1200 according to some aspects of the present disclosure. The scheme 1200 may be employed by sidelink UEs such as the UEs 115 and/or 215 in a network such as the networks 100 for multiplexing an S-SSB transmission with a PSCCH/PSSCH transmission, for example, to meet an OCB requirement of a frequency band. In FIG. 12, the x-axis represents time in some arbitrary units, and the y-axis represents frequency in some arbitrary units. The scheme 1200 is described using the same frequency interlaced resource structure as in the scheme 500 and may use the same reference numerals as in FIG. 5 for simplicity's sake. The scheme 1200 is substantially similar to the scheme 600. For instance, a sidelink sync UE 215 transmits an S-SSB 424 according to an NR-U sync raster 405 in the SL BWP 422 over the frequency band 502 as shown by the view 1201.

To satisfy an OCB requirement of the frequency band 502, the sidelink sync UE 215 transmits a PSCCH transmission 610 and a CSI-RS 1230 in a frequency interlace 508 (e.g., in the frequency interlace $508_{I(4)}$) at the same time as the S-SSB 434 transmission. The CSI-RS 1230 transmission is shown in a separate view 1202 for clarity of illustration. The CSI-RS 1230 may include a set of pilot symbols carried in the PSSCH transmission 620. Each pilot symbol may occupy one RE (e.g., the RE 312) and may distributed in time and frequency. The time and/or frequency density of the pilot symbols may be configured according to a certain channel condition and/or a certain performance target. For instance, when operating under a high Doppler, pilot symbols with higher time density may allow for a more accurate channel estimate at a receiving sidelink UE. On the other hand, when operating under a channel delay spread, pilot symbols with higher frequency density may allow for a more accurate channel estimate at a receiving sidelink UE. For instance, in some examples, the CSI-RS 1230 may include pilot symbols in adjacent or consecutive OFDM symbols (e.g., the symbols 306). In some other examples, the CSR-RS 1230 may include pilot symbols in distributed OFDM symbols (e.g., in OFDM symbols spaced apart from each other by one or more other OFDM symbols).

To avoid collision with the S-SSB 434 transmission, the sidelink sync UE 215 may puncture the CSI-RS 1230 at REs (e.g., as shown by the dashed box 1206) that are overlapping a frequency resource used by the S-SSB 434 transmission. In some aspects, a receiving sidelink UE (e.g., the UEs 115 and/or 215) aware of the slots 514*d* configured for the S-SSB 434 transmission may be aware of where the CSI-RS 1230 is punctured. In some aspects, the sidelink sync UE 215 may include a CSI-RS trigger in SCI (e.g., a stage one SCI) carried by the PSCCH transmission 610. As such, a receiving sidelink UE may also infer that the PSSCH transmission 620 carries a CSI-RS 1230 with punctured REs at locations corresponding to frequency resources used by the S-SSB 434 transmission.

In some aspects, the sidelink sync UE 215 may transmit sidelink data along with the CSI-RS 1230 in the PSSCH transmission 620 when multiplexing the PSSCH transmission 620 and PSCCH transmission 610 with the S-SSB 434 transmission.

While the scheme 1200 is e illustrated using the S-SSB transmission scheme 430 of FIG. 4C, the scheme 1200 and 1110 may be applied with the S-SSB transmission scheme 420 of FIG. 4B.

FIG. 13 is a block diagram of an exemplary BS 1300 according to some aspects of the present disclosure. The BS 1300 may be a BS 105 in the network 100 as discussed above in FIG. 1. A shown, the BS 1300 may include a processor 1302, a memory 1304, an sidelink configuration module 1308, a transceiver 1310 including a modem subsystem 1312 and a RF unit 1314, and one or more antennas 1316. These elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example, aspects of FIGS. 2-3, 4A-4C, and 5-12. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink configuration module 1308 may be implemented via hardware, software, or combinations thereof. For example, the sidelink configuration module 1308 may be implemented as a processor, circuit, and/or instructions 1306 stored in the memory 1304 and executed by the processor 1302. In some examples, the sidelink configuration module 1308 can be integrated within the modem subsystem 1312. For example, the sidelink configuration module 1308 can be implemented by a combination of software components (e.g., executed by a DSP or a general processor) and hardware components (e.g., logic gates and circuitry) within the modem subsystem 1312.

The sidelink configuration module 1308 may be used for various aspects of the present disclosure, for example, aspects of FIGS. 2-3, 4A-4C, and 5-12. The sidelink configuration module 1308 is configured to determine a multiplex configuration for multiplexing a sidelink transmission with an S-SSB transmission in a sidelink BWP and. transmit, to a UE (e.g., the UEs 115, 215, and/or 1400), the multiplex configuration.

In some aspects, the sidelink configuration module 1308 is configured to configure a sidelink sync UE to transmit the S-SSB transmission as discussed above with reference to FIGS. 4B and 4C, respectively. In some aspects, the sidelink configuration module 1308 is configured to configure a sidelink sync UE to multiplex the S-SSB transmission with the sidelink transmission using a frequency interlace (e.g., distributed RBs) as discussed above with reference to FIGS. 6, 7, 8, and/or 9. In some aspects, the sidelink configuration module 1308 is configured to configure a sidelink sync UE to multiplex the S-SSB transmission with the sidelink transmission in a subchannel (e.g., contiguous RBs) and may configure the sidelink sync UE to select between a frequency interlace-based resource pool or a subchannel-based resource pool base on whether a sidelink slot is configured for S-SSB transmission as discussed above with reference to FIGS. 10 and/or 11.

As shown, the transceiver 1310 may include the modem subsystem 1312 and the RF unit 1314. The transceiver 1310 can be configured to communicate bi-directionally with other devices, such as the UEs 115 and/or another core network element. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., RRC configuration, S-SSB transmission configuration, sidelink resource pools configurations) from the modem subsystem 1312 (on outbound transmissions) or of transmissions originating from another source such as a UE 115. The RF unit 1314 may be further configured to perform analog beamforming in conjunction with the digital beamforming. Although shown as integrated together in transceiver 1310, the modem subsystem 1312 and/or the RF unit 1314 may be separate devices that are coupled together at the BS 105 to enable the BS 105 to communicate with other devices.

The RF unit 1314 may provide the modulated and/or processed data, e.g. data packets (or, more generally, data messages that may contain one or more data packets and other information), to the antennas 1316 for transmission to one or more other devices. This may include, for example, transmission of information to complete attachment to a network and communication with a camped UE 115 according to some aspects of the present disclosure. The antennas 1316 may further receive data messages transmitted from other devices and provide the received data messages for processing and/or demodulation at the transceiver 1310. The transceiver 1310 may provide the demodulated and decoded data to the sidelink configuration module 1308 for processing. The antennas 1316 may include multiple antennas of similar or different designs in order to sustain multiple transmission links.

In an aspect, the BS 1300 can include multiple transceivers 1310 implementing different RATs (e.g., NR and LTE). In an aspect, the BS 1300 can include a single transceiver 1310 implementing multiple RATs (e.g., NR and LTE). In an aspect, the transceiver 1310 can include various components, where different combinations of components can implement different RATs.

FIG. 14 is a block diagram of an exemplary UE 1400 according to some aspects of the present disclosure. The UE 1400 may be a UE 115 as discussed above with respect to FIG. 1. As shown, the UE 1400 may include a processor 1402, a memory 1404, an S-SSB and PSCCH/PSSCH multiplex module 1408, a transceiver 1410 including a modem subsystem 1412 and a radio frequency (RF) unit 1414, and one or more antennas 1416. These elements may be in direct or indirect communication with each other, for example via one or more buses.

The processor 1402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1404 includes a non-transitory computer-readable medium. The memory 1404 may store, or have recorded thereon, instructions 1406. The instructions 1406 may include instructions that, when executed by the processor 1402, cause the processor 1402 to perform the operations described herein with reference to the UEs 115 in connection with aspects of the present disclosure, for example, aspects of FIGS. 2-3, 4A-4C, and 5-12. Instructions 1406 may also be referred to as program code, which may be interpreted broadly to include any type of computer-readable statement(s) as discussed above with respect to FIG. 13.

The S-SSB and PSCCH/PSSCH multiplex module 1408 may be implemented via hardware, software, or combinations thereof. For example, the S-SSB and PSCCH/PSSCH multiplex module 1408 may be implemented as a processor, circuit, and/or instructions 1406 stored in the memory 1404 and executed by the processor 1402. In some examples, the S-SSB and PSCCH/PSSCH multiplex module 1408 can be integrated within the modem subsystem 1412. For example, the S-SSB and PSCCH/PSSCH multiplex module 1408 can be implemented by a combination of software components (e.g., executed by a DSP or a general processor) and hardware components (e.g., logic gates and circuitry) within the modem subsystem 1412.

The S-SSB and PSCCH/PSSCH multiplex module 1408 may be used for various aspects of the present disclosure, for example, aspects of FIGS. 2-3, 4A-4C, and 5-12. The S-SSB and PSCCH/PSSCH multiplex module 1408 is configured to determine a multiplex configuration for multiplexing a sidelink transmission with an S-SSB transmission in a sidelink BWP, communicate, in the sidelink BWP during a sidelink slot, the S-SSB transmission, and communicate, in the sidelink BWP during the sidelink slot, the sidelink transmission by the communicating the S-SSB transmission and the communicating the sidelink transmission includes multiplexing the sidelink transmission and the S-SSB transmission based on the multiplex configuration.

In some aspects, the S-SSB and PSCCH/PSSCH multiplex module 1408 is configured to transmit the S-SSB transmission as discussed above with reference to FIGS. 4B and 4C, respectively. In some aspects, the S-SSB and PSCCH/PSSCH multiplex module 1408 is configured to multiplex the S-SSB transmission with the sidelink transmission transmitted in a frequency interlace (e.g., distributed RBs) as discussed above with reference to FIGS. 6, 7, 8, and/or 9. In some aspects, the S-SSB and PSCCH/PSSCH multiplex module 1408 is configured to multiplex the S-SSB transmission with the sidelink transmission transmitted in a subchannel (e.g., contiguous RBs) and may determine whether to utilize a frequency interlace-based resource pool or a subchannel-based resource pool base on whether a sidelink slot is configured for S-SSB transmission as discussed above with reference to FIGS. 10 and/or 11. In some aspects, the sidelink transmission can include at least one of sidelink data or a CSI-RS discussed above with reference to FIG. 12.

As shown, the transceiver 1410 may include the modem subsystem 1412 and the RF unit 1414. The transceiver 1410 can be configured to communicate bi-directionally with other devices, such as the BSs 105. The modem subsystem 1412 may be configured to modulate and/or encode the data from the memory 1404 and/or the S-SSB and PSCCH/PSSCH multiplex module 1408 according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., PSCCH, PSSCH, SCI, sidelink data, S-SSBs, CSI-RS, CSI-RS trigger) from the modem subsystem 1412 (on outbound transmissions) or of transmissions originating from another source such as a UE 115 or a BS 105. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the UE 115 to enable the UE 115 to communicate with other devices.

The RF unit 1414 may provide the modulated and/or processed data, e.g. data packets (or, more generally, data messages that may include one or more data packets and other information), to the antennas 1416 for transmission to one or more other devices. The antennas 1416 may further receive data messages transmitted from other devices. The antennas 1416 may provide the received data messages for processing and/or demodulation at the transceiver 1410. The transceiver 1410 may provide the demodulated and decoded data (e.g., RRC configuration, S-SSB transmission configuration, sidelink resource pools configurations) to the S-SSB and PSCCH/PSSCH multiplex module 1408 for processing. The antennas 1416 may include multiple antennas of similar or different designs in order to sustain multiple transmission links. The RF unit 1414 may configure the antennas 1416.

In an aspect, the UE 1400 can include multiple transceivers 1410 implementing different RATs (e.g., NR and LTE). In an aspect, the UE 1400 can include a single transceiver 1410 implementing multiple RATs (e.g., NR and LTE). In an aspect, the transceiver 1410 can include various components, where different combinations of components can implement different RATs.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the UEs 115, 215, or 1400 may utilize one or more components, such as the processor 1402, the memory 1404, the S-SSB and PSCCH/PSSCH multiplex module 1408, the transceiver 1410, the modem 1412, and the one or more antennas 1416, to execute the steps of method 1500. The method 1500 may employ similar mechanisms as described above in FIGS. 2-3, 4A-4C, and 5-12. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a UE (e.g., the UEs 115, 215, and/or 1400) determines a multiplex configuration for multiplexing a sidelink transmission with an S-SSB transmission in a sidelink BWP (e.g., the SL BWP 422). In some instances, the UE may utilize one or more components, such as the processor 1402, the memory 1404, the S-SSB and PSCCH/PSSCH multiplex module 1408, the transceiver 1410, the modem 1412, and the one or more antennas 1416, to determine the multiplex configuration, for example, whether to use a frequency-interlaced waveform sidelink transmission with frequency-multiplex PSCCH/PSSCH, a time-interlaced waveform sidelink transmission with frequency-multiplex PSCCH/PSSCH, or a subchannel-based waveform sidelink transmission for the multiplexing.

At block 1520, the UE communicates, in the sidelink BWP during a sidelink slot, the S-SSB transmission. In some instances, the UE may utilize one or more components, such as the processor 1402, the memory 1404, the S-SSB and PSCCH/PSSCH multiplex module 1408, the transceiver 1410, the modem 1412, and the one or more antennas 1416, to communicate the S-SSB transmission.

In some aspects, the S-SSB transmission is at an offset from a lowest frequency of the sidelink BWP based on a synchronization raster, for example, as shown in the scheme 420 discussed with reference to FIG. 4B. In some aspects, the S-SSB transmission is aligned to a lowest frequency of the sidelink BWP, for example, as shown in the scheme 430 discussed with reference to FIG. 4C.

At block 1530, the UE communicates, in the sidelink BWP during the sidelink slot, the sidelink transmission. As part of the communicating the S-SSB transmission and the communicating the sidelink transmission, the UE multiplexes the sidelink transmission and the S-SSB transmission based on the multiplex configuration. In some instances, the UE may utilize one or more components, such as the processor 1402, the memory 1404, the S-SSB and PSCCH/PSSCH multiplex module 1408, the transceiver 1410, the modem 1412, and the one or more antennas 1416, to communicate the sidelink transmission.

In some aspects, the UE may correspond to a sidelink sync UE. As part of communicating the S-SSB transmission at block 1520, the UE may transmit the S-SSB transmission. As part of communicating the sidelink transmission at block 1530, the UE may transmit the sidelink transmission. In some aspects, the UE may correspond to a receiving sidelink UE. As part of communicating the S-SSB transmission at block 1520, the UE may receive the S-SSB transmission. As part of communicating the sidelink transmission at block 1530, the UE may receive the sidelink transmission.

In some aspects, as part of communicating the sidelink transmission at block 1530, the UE may communicate at least one of a PSCCH transmission (e.g., PSCCH transmission 610) or a PSSCH transmission (e.g., the PSSCH transmission 620). In some aspects, as part of communicating the sidelink transmission, the UE communicates the sidelink transmission in a first frequency interlace (e.g., the frequency interlaces 508) within the sidelink BWP, the PSCCH transmission and the PSSCH transmission being multiplexed in at least one of time or frequency, for example, as shown in the schemes 600, 700, 800, and/or 900 discussed with reference to FIGS. 6, 7, 8, and/or 9, respectively.

In some aspects, the UE multiplexes the PSCCH transmission and the PSSCH transmission in the frequency. The first frequency interlace includes a plurality of RBs spaced apart from each other by at least one other RB in the sidelink BWP. As part of communicating the sidelink transmission at block 1530, the UE communicates the PSCCH transmission in a lowest frequency RB and a highest frequency RB of the plurality of RBs, and communicates the PSSCH transmission in one or more remaining RBs of the plurality of RBs. In some aspects, the UE further selects the first frequency interlace from a plurality of frequency interlaces in the sidelink BWP for communicating the sidelink transmission based on the lowest frequency RB of the first frequency interlace being non-overlapping with a frequency resource used for the S-SSB transmission. In some aspects, as part of communicating the sidelink transmission at block 1530, the UE may communicates the sidelink transmission in a subset of the plurality of RBs excluding at least a lowest frequency RB of the plurality of RBs based on the S-SSB transmission being aligned to a lowest frequency of the sidelink BWP. In some aspects, as apart of communicating the sidelink transmission at block 1530, the UE may communicate the PSCCH transmission in a lowest frequency RB and a highest frequency RB of the subset of the plurality of RBs (e.g., a partial interlace), and communicate the PSSCH transmission in one or more remaining RBs of subset of the plurality of RBs. In some aspects, the UE may further monitor for sidelink control information (SCI) during the sidelink slot by performing blind decoding in the lowest frequency RB and the highest frequency RB of the subset of the plurality of RBs, and performing blind decoding in a lowest frequency RB and a highest frequency RB of the plurality of RBs.

In some aspects, the UE multiplexes the PSCCH transmission and the PSSCH transmission in time. In some aspects, the UE may puncture, in response to the PSCCH transmission and the PSSCH transmission being multiplexed in the time, the PSCCH transmission based on the S-SSB transmission. In some aspects, the UE may rate-match, in response to the PSCCH transmission and the PSSCH transmission being multiplexed in the time, the PSCCH transmission based on the S-SSB transmission. In some aspects, as part of communicating the sidelink transmission at block 1530, the UE may transmit, in response to the PSCCH transmission and the PSCCH transmission being multiplexed in time, the PSCCH transmission in CCEs non-overlapping with a frequency resource used for the S-SSB transmission. In some aspects, the UE may further receive a schedule for the PSCCH transmission in the CCEs non-overlapping with a frequency resource used for the S-SSB transmission.

In some aspects, when the UE multiplexes the PSCCH transmission and the PSSCH transmission 620 in time and/or frequency, the UE may puncture the PSSCH transmission based on the S-SSB transmission. In some aspects, the UE may rate-match the PSSCH transmission based on the S-SSB transmission and may indicate rate-matching information in SCI in the PSCCH transmission.

In some aspects, as part of the communicating the S-SSB transmission at block 1520, the UE may transmit the S-SSB transmission. As part of communicating the sidelink transmission at block 1530, the UE may transmit at least one of a channel state information-reference signal (CSI-RS) or sidelink data in the first frequency interlace, the sidelink transmission multiplexed with the S-SSB transmission based an occupancy channel bandwidth (OCB) parameter. In some aspects, as part of communicating the sidelink transmission at block 1530, the UE may transmit the PSCCH transmission including a trigger for the CSI-RS and transmit the PSSCH transmission including the CSI-RS punctured based on the S-SSB transmission, where the PSSCH transmission is multiplexed with the PSCCH transmission in the frequency, for example, as shown in the scheme 1200 discussed above with reference to FIG. 12.

In some aspects, as part of the communicating the S-SSB transmission at block 1520, the UE may receive the S-SSB transmission. As part of communicating the sidelink transmission at block 1530, the UE may receive least one of a channel state information-reference signal (CSI-RS) or sidelink data in the first frequency interlace. In some aspects, as part of communicating the sidelink transmission, the UE may receive the PSCCH transmission including a trigger for the CSI-RS and receive the PSSCH transmission including the CSI-RS punctured based on the S-SSB transmission, where the PSSCH transmission is multiplexed with the PSCCH transmission in the frequency, for example, as shown in the scheme 1200 discussed above with reference to FIG. 12.

In some aspects, as part of communicating the sidelink transmission at block 1530, the UE may communicate the PSCCH transmission and the PSSCH transmission in a first subchannel within the sidelink BWP non-overlapping with a frequency resource used for the S-SSB transmission, the PSCCH transmission and the PSSCH transmission being multiplexed in time. In some aspects, the UE may further determine whether to select a first resource pool including a plurality of frequency interlaces in the sidelink BWP or a second resource pool including a plurality of subchannels in the sidelink BWP for communicating the sidelink transmission in the sidelink slot based on whether the sidelink slot is configured for the S-SSB transmission, the plurality of subchannels including the first subchannel. In some aspects, the determining whether to select the first resource pool or the second resource pool is further based on a periodicity associated with the S-SSB transmission. In some aspects, the UE further receives a resource pool configuration indicating the first resource pool including the plurality of frequency interlaces and the second resource pool including the plurality of subchannels, for example, as shown in the schemes 1000 and/or 1100 discussed with reference to FIGS. 10 and/or 11, respectively. In some aspects, the UE may further monitoring for SCI in the PSCCH transmission within the first subchannel in the second resource pool based on the sidelink slot being configured for the S-SSB transmission. In some aspects, the UE may further monitor, for first SCI during a further sidelink slot different from the sidelink slot, the monitoring comprising performing blind decoding in at least one of the first resource pool or the second resource pool. In some aspects, the UE may select the first subchannel from the plurality of subchannels for communicating the sidelink transmission based on an OCB parameter. In some aspects, the selecting the first subchannel includes prioritizing the first subchannel over a second subchannel of the plurality of subchannels for communicating the sidelink transmission based on the first subchannel being at a higher frequency than the second subchannel. In some aspects, as part of communicating the S-SSB transmission at block

1530, the UE may transmit, during the sidelink slot, the S-SSB transmission in the sidelink BWP. As part of communicating the sidelink transmission at block 1530, the UE may transmit, during the sidelink slot, the sidelink transmission in the first subchannel within the sidelink BWP, the sidelink transmission multiplexed with the S-SSB transmission in the sidelink slot based on an OCB parameter. In some aspects, as part of the communicating the S-SSB transmission at block 1520, the UE may receive, during the sidelink slot, the S-SSB transmission in the sidelink BWP. As part of communicating the sidelink transmission at block 1530, the UE may receive, during the sidelink slot, the sidelink transmission in the first subchannel within the sidelink BWP.

FIG. 16 is a flow diagram of a wireless communication method 1600 according to some aspects of the present disclosure. Aspects of the method 1600 can be executed by a computing device (e.g., a processor, processing circuit, and/or other suitable component) of a wireless communication device or other suitable means for performing the steps. For example, a wireless communication device, such as the BSs 105, 205, or 1300 may utilize one or more components, such as the processor 1302, the memory 1304, the sidelink configuration module 1308, the transceiver 1310, the modem 1312, and the one or more antennas 1316, to execute the steps of method 1600. The method 1600 may employ similar mechanisms as described above in FIGS. 2-3, 4A-4C, and 5-12. As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, a BS (e.g., the BSs 105, 205, and/or 1300) determines a multiplex configuration for multiplexing a sidelink transmission with an S-SSB transmission in a sidelink BWP (e.g., the SL BWP 422). In some instances, the BS may utilize one or more components, such as the processor 1302, the memory 1304, the sidelink configuration module 1308, the transceiver 1310, the modem 1312, and the one or more antennas 1316, to determine the multiplex configuration, for example, whether to use a frequency-interlaced waveform sidelink transmission with frequency-multiplex PSCCH/PSSCH, a time-interlaced waveform sidelink transmission with frequency-multiplex PSCCH/PSSCH, or a subchannel-based waveform sidelink transmission for the multiplexing.

In some aspects, the S-SSB transmission is offset from a lowest frequency of the sidelink BWP based on a synchronization raster. In some aspects, the S-SSB transmission is aligned to a lowest frequency of the sidelink BWP. In some aspects, the sidelink transmission comprises at least one of a PSCCH transmission or a PSSCH transmission multiplexed in at least one of time or frequency.

At block 1620, the BS transmits, to a UE (e.g., the UEs 115, 215, and/or 1400), the multiplex configuration. In some instances, the BS may utilize one or more components, such as the processor 1302, the memory 1304, the sidelink configuration module 1308, the transceiver 1310, the modem 1312, and the one or more antennas 1316, to transmit the multiplex configuration to the UE.

In some aspects, the BS may further transmit, to the UE, a resource configuration indicating a first resource pool including a plurality of frequency interlaces in the sidelink BWP for communicating the sidelink transmission. In some aspects, the BS may further transmit to the UE, a schedule for the PSCCH transmission and the PSSCH transmission in a first frequency interlace of the plurality of frequency interlaces, the PSCCH transmission scheduled in CCEs non-overlapping with a frequency resource used for the S-SSB transmission based on the PSCCH transmission being multiplexed with the PSSCH transmission in the time. In some aspects, the resource configuration may further indicate a second resource pool including a plurality of subchannels in the sidelink BWP, for example, as shown in the schemes 1000 and/or 1100 discussed above with reference to FIGS. 10 and/or 11. The first resource pool may include a first set of sidelink slots and the second resource pool may include a second set of sidelink slots different from the first set of sidelink slots, the second set of sidelink slots associated with a periodicity of the S-SSB transmission. In some aspects, the BS may determine a number of resource pools including the first resource pool and the second resource pool based on a capability of the UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
  determining a multiplex configuration for multiplexing a sidelink transmission with a sidelink-synchronization signal block (S-SSB) transmission in a sidelink bandwidth part (BWP);
  communicating, in the sidelink BWP during a sidelink slot, the S-SSB transmission; and
  communicating, in the sidelink BWP during the sidelink slot, the sidelink transmission, wherein the communicating the S-SSB transmission and the communicating the sidelink transmission includes multiplexing the sidelink transmission and the S-SSB transmission based on the multiplex configuration.

2. The method of claim 1, wherein the communicating the S-SSB transmission comprises:
  communicating the S-SSB transmission at an offset from a lowest frequency of the sidelink BWP based on a synchronization raster.

3. The method of claim 1, wherein the communicating the S-SSB transmission comprises:
  communicating the S-SSB transmission aligned to a lowest frequency of the sidelink BWP.

4. The method of claim 1, wherein the communicating the sidelink transmission comprises:
  communicating at least of a physical sidelink control channel (PSCCH) transmission or a physical sidelink shared channel (PSSCH) transmission.

5. The method of claim 4, wherein the communicating the sidelink transmission further comprises:
  communicating the sidelink transmission in a first frequency interlace within the sidelink BWP, the PSCCH transmission and the PSSCH transmission being multiplexed in at least one of time or frequency.

6. The method of claim 5, wherein the first frequency interlace includes a plurality of resource blocks (RBs) spaced apart from each other by at least one other RB in the sidelink BWP, and wherein the communicating the sidelink transmission further comprises:
  communicating the PSCCH transmission in a lowest frequency RB and a highest frequency RB of the plurality of RBs; and
  communicating the PSSCH transmission in one or more remaining RBs of the plurality of RBs.

7. The method of claim 5, wherein the first frequency interlace includes a plurality of resource blocks (RBs) spaced apart from each other by at least one other RBs in the sidelink BWP, and wherein the communicating the sidelink transmission further comprises:
  communicating the sidelink transmission in a subset of the plurality of RBs excluding at least a lowest frequency RB of the plurality of RBs based on the S-SSB transmission being aligned to a lowest frequency of the sidelink BWP.

8. The method of claim 7, wherein the communicating the sidelink transmission further comprises:
  communicating the PSCCH transmission in a lowest frequency RB and a highest frequency RB of the subset of the plurality of RBs; and
  communicating the PSSCH transmission in one or more remaining RBs of subset of the plurality of RBs, wherein the method further comprises:
    monitoring for sidelink control information (SCI) during the sidelink slot, the monitoring comprising:

performing blind decoding in the lowest frequency RB and the highest frequency RB of the subset of the plurality of RBs; and
      performing blind decoding in a lowest frequency RB and a highest frequency RB of the plurality of RBs.

9. The method of claim 5, further comprising:
  puncturing the PSSCH transmission based on the S-SSB transmission.

10. The method of claim 5, further comprising:
  rate-matching the PSSCH transmission based on the S-SSB transmission.

11. The method of claim 10, wherein the communicating the sidelink transmission further comprises:
  communicating, in the PSCCH transmission, sidelink control information (SCI) including rate-matching information for the PSSCH transmission.

12. The method of claim 5, wherein:
  the communicating the S-SSB transmission comprises:
    transmitting the S-SSB transmission, and
  the communicating the sidelink transmission comprises:
    transmitting at least one of a channel state information-reference signal (CSI-RS) or sidelink data in the first frequency interlace, the sidelink transmission multiplexed with the S-SSB transmission based an occupancy channel bandwidth (OCB) parameter.

13. The method of claim 5, wherein:
  the communicating the S-SSB transmission comprises:
    receiving the S-SSB transmission, and
  wherein the communicating the sidelink transmission comprises:
    receiving at least one of a channel state information-reference signal (CSI-RS) or sidelink data in the first frequency interlace.

14. The method of claim 4, wherein the communicating the sidelink transmission comprises:
  communicating the PSCCH transmission and the PSSCH transmission in a first subchannel within the sidelink BWP non-overlapping with a frequency resource used for the S-SSB transmission, the PSCCH transmission and the PSSCH transmission being multiplexed in time.

15. The method of claim 14, further comprising:
  determining whether to select a first resource pool including a plurality of frequency interlaces in the sidelink BWP or a second resource pool including a plurality of subchannels in the sidelink BWP for communicating the sidelink transmission in the sidelink slot based on whether the sidelink slot is configured for the S-SSB transmission, the plurality of subchannels including the first subchannel.

16. The method of claim 15, further comprising:
  monitoring for sidelink control information (SCI) in the PSCCH transmission within the first subchannel in the second resource pool based on the sidelink slot being configured for the S-SSB transmission.

17. The method of claim 15, further comprising:
  monitoring, for first sidelink control information (SCI) during a further sidelink slot different from the sidelink slot, the monitoring comprising performing blind decoding in at least one of the first resource pool or the second resource pool.

18. The method of claim 15, further comprising:
  selecting the first subchannel from the plurality of subchannels for communicating the sidelink transmission based on an occupancy channel bandwidth (OCB) parameter.

19. The method of claim 18, wherein the selecting the first subchannel comprises:

prioritizing the first subchannel over a second subchannel of the plurality of subchannels for communicating the sidelink transmission based on the first subchannel being at a higher frequency than the second subchannel.

20. A user equipment (UE) comprising:

a processor configured to:

determine a multiplex configuration for multiplexing a sidelink transmission with a sidelink-synchronization signal block (S-SSB) transmission in a sidelink bandwidth part (BWP); and a transceiver configured to:

communicate, in the sidelink BWP during a sidelink slot, the S-SSB transmission; and communicate, in the sidelink BWP during the sidelink slot, the sidelink transmission, wherein the transceiver configured to communicate the S-SSB transmission and the sidelink transmission is configured to multiplex the sidelink transmission and the S-SSB transmission based on the multiplex configuration.

21. The UE of claim 20, wherein the transceiver configured to communicate the S-SSB transmission is configured to:

communicate the S-SSB transmission at an offset from a lowest frequency of the sidelink BWP based on a synchronization raster.

22. The UE of claim 20, wherein the transceiver configured to communicate the S-SSB transmission is configured to:

communicate the S-SSB transmission aligned to a lowest frequency of the sidelink BWP.

23. The UE of claim 20, wherein the transceiver configured to communicate the sidelink transmission is configured to:

communicate at least of a physical sidelink control channel (PSCCH) transmission or a physical sidelink shared channel (PSSCH) transmission.

24. The UE of claim 23, wherein the transceiver configured to communicate the sidelink transmission is configured to:

communicate the sidelink transmission in a first frequency interlace within the sidelink BWP, the PSCCH transmission and the PSSCH transmission being multiplexed in at least one of time or frequency, and wherein the first frequency interlace includes a plurality of resource blocks (RBs) spaced apart from each other by at least one other RB in the sidelink BWP, and wherein the transceiver configured to communicate the sidelink transmission is configured to:

communicate the PSCCH transmission in a lowest frequency RB and a highest frequency RB of the plurality of RBs; and communicate the PSSCH transmission in one or more remaining RBs of the plurality of RBs.

25. The UE of claim 24, wherein the first frequency interlace includes a plurality of resource blocks (RBs) spaced apart from each other by at least one other RBs in the sidelink BWP, and wherein the transceiver configured to communicate the sidelink transmission is configured to:

communicate the sidelink transmission in a subset of the plurality of RBs excluding at least a lowest frequency RB of the plurality of RBs based on the S-SSB transmission being aligned to a lowest frequency of the sidelink BWP.

26. The UE of claim 25, wherein the transceiver configured to communicate the sidelink transmission is configured to:

communicate the PSCCH transmission in a lowest frequency RB and a highest frequency RB of the subset of the plurality of RBs; and communicate the PSSCH transmission in one or more remaining RBs of subset of the plurality of RBs, and wherein the processor is further configured to:

monitor for sidelink control information (SCI) during the sidelink slot, the monitoring comprising:

performing blind decoding in the lowest frequency RB and the highest frequency RB of the subset of the plurality of RBs; and performing blind decoding in a lowest frequency RB and a highest frequency RB of the plurality of RBs.

27. The UE of claim 24, wherein the processor is further configured to:

puncture the PSSCH transmission based on the S-SSB transmission.

28. The UE of claim 24, wherein the processor is further configured to:

rate-match the PSSCH transmission based on the S-SSB transmission, wherein the transceiver configured to communicate the sidelink transmission is configured to:

communicate, in the PSCCH transmission, sidelink control information (SCI) including rate-matching information for the PSSCH transmission.

29. The UE of claim 24, wherein:

the transceiver configured to communicate the S-SSB transmission is configured to:

transmit the S-SSB transmission, and the transceiver configured to communicate the sidelink transmission is configured to:

transmit at least one of a channel state information-reference signal (CSI-RS) or sidelink data in the first frequency interlace, the sidelink transmission multiplexed with the S-SSB transmission based an occupancy channel bandwidth (OCB) parameter.

30. The UE of claim 24, wherein:

the transceiver configured to communicate the S-SSB transmission is configured to:

receive the S-SSB transmission, and the transceiver configured to communicate the sidelink transmission is configured to:

receive at least one of a channel state information-reference signal (CSI-RS) or sidelink data in the first frequency interlace.

31. The UE of claim 23, wherein the transceiver configured to communicate the sidelink transmission is configured to:

communicate the PSCCH transmission and the PSSCH transmission in a first subchannel within the sidelink BWP non-overlapping with a frequency resource used for the S-SSB transmission, the PSCCH transmission and the PSSCH transmission being multiplexed in time.

32. The UE of claim 31, wherein the processor is further configured to:

determine whether to select a first resource pool including a plurality of frequency interlaces in the sidelink BWP or a second resource pool including a plurality of subchannels in the sidelink BWP for communicating the sidelink transmission in the sidelink slot based on whether the sidelink slot is configured for the S-SSB transmission, the plurality of subchannels including the first subchannel.

33. The UE of claim 32, wherein the processor is further configured to:

monitor for sidelink control information (SCI) in the PSCCH transmission within the first subchannel in the second resource pool based on the sidelink slot being configured for the S-SSB transmission.

34. The UE of claim 32, wherein the processor is further configured to:

monitor, for first sidelink control information (SCI) during a further sidelink slot different from the sidelink slot, the monitoring comprising performing blind decoding in at least one of the first resource pool or the second resource pool.

35. The UE of claim 32, wherein the processor is further configured to:

select the first subchannel from the plurality of subchannels for communicating the sidelink transmission based on an occupancy channel bandwidth (OCB) parameter, and wherein the processor configured to select the first subchannel is configured to:

prioritize the first subchannel over a second subchannel of the plurality of subchannels for communicating the sidelink transmission based on the first subchannel being at a higher frequency than the second subchannel.

* * * * *